US012710296B2

(12) United States Patent
Schulte et al.

(10) Patent No.: US 12,710,296 B2
(45) Date of Patent: Aug. 18, 2026

(54) PIVOTING SENSOR MOUNTING SYSTEM

(71) Applicant: Wren Associates, Ltd., Jefferson City, MO (US)

(72) Inventors: Fay Ann Schulte, Lohman, MO (US); Paul Anthony Williams, Loose Creek, MO (US); Justin Joseph Eikel, Centralia, MO (US); Seth Robert Allen, Jefferson City, MO (US); Jason Gregory Lockett, Columbia, MO (US)

(73) Assignee: Wren Associates, Ltd., Jefferson City, MO (US)

( * ) Notice: Subject to any disclaimer, the term of this patent is extended or adjusted under 35 U.S.C. 154(b) by 0 days.

(21) Appl. No.: 19/319,254

(22) Filed: Sep. 4, 2025

(65) Prior Publication Data

US 2026/0071899 A1 Mar. 12, 2026

Related U.S. Application Data

(60) Provisional application No. 63/691,635, filed on Sep. 6, 2024.

(51) Int. Cl.

| | |
|---|---|
| ***G01D 11/30*** | (2006.01) |
| ***F16C 11/10*** | (2006.01) |
| ***G03B 17/56*** | (2021.01) |
| ***H04N 23/51*** | (2023.01) |
| ***H04N 23/54*** | (2023.01) |

(52) U.S. Cl.

CPC .............. *G01D 11/30* (2013.01); *F16C 11/10* (2013.01); *G03B 17/561* (2013.01); *H04N 23/51* (2023.01); *H04N 23/54* (2023.01)

(58) Field of Classification Search

None

See application file for complete search history.

(56) References Cited

U.S. PATENT DOCUMENTS

| | | | | |
|---|---|---|---|---|
| 5,152,029 A * | 10/1992 | Pai | E05F 3/20 | 16/54 |
| 6,398,175 B1 * | 6/2002 | Conner | B25B 1/2405 | 248/228.3 |
| 2005/0196163 A1 * | 9/2005 | Mootz | G03B 17/561 | 396/428 |

FOREIGN PATENT DOCUMENTS

KR 100717299 B1 5/2007

OTHER PUBLICATIONS

PCT/US2025/044822 International Search Report and Written Opinion mailed Dec. 18, 2025, 9 pages.

* cited by examiner

*Primary Examiner* — Mark A Shabman

(74) *Attorney, Agent, or Firm* — Goodwin Procter LLP

(57) ABSTRACT

Disclosed is an innovative sensor mounting system featuring a pivot mechanism that allows the sensor unit to automatically return to its original sensor detection area after being displaced by impacts, such as those from forklifts, workers or the like. The pivot mechanism enables the sensor unit to maintain a comprehensive sensor detection area, ensuring complete visibility for monitoring loading and unloading operations.

20 Claims, 24 Drawing Sheets

PIVOTING SENSOR MOUNTING SYSTEM

CROSS-REFERENCE TO RELATED APPLICATION

This application claims the benefit of U.S. Provisional Patent Application No. 63/691,635, titled "PIVOTING SENSOR MOUNTING SYSTEM," and filed on Sep. 6, 2024, the entire content of which is incorporated by reference herein.

BACKGROUND

Sensors are used for monitoring many different types of events, such as retail environments, pedestrian and automobile traffic, warehouse flow patterns, construction areas, and the like. The environments where these different events occur can result in physical damage to the sensor and the sensor mounting system. The physical damage to the sensor and the sensor mounting system may range from damage to the sensor that renders it unusable, damage to the sensor mounting system that renders the sensor mounting system unusable, or damage to the sensor that changes a sensor detection area.

Many systems to mitigate or prevent the physical damage have been proposed. However, some of these are directed to preventing damage from objects falling on top of the sensor or a flexible member that absorbs impacts to the sensor.

SUMMARY

In one aspect, a sensor mounting system is presented. The sensor mounting system may include at least one sensor unit including a sensor housing and a sensor housing arm. The sensor mounting system may include a mounting base. The mounting base may include a pivot mechanism. The pivot mechanism may include a rotating tubular member having a rotating tubular member connection arm coupled to the sensor housing arm. The pivot mechanism may include an extension locking bracket. The sensor mounting system may include a pivot mechanism coupled to a sensor housing arm. The mounting base may include a mounting bracket coupled to the extension locking bracket. The mounting base may include a surface mounting tab and a track clamp mechanism each coupled to the mounting bracket. The surface mounting tab may be configured to be rigidly fixed to a surface and additional mounting security may be provided by a compression force of the track clamp mechanism.

In another aspect, a mounting base for a sensor mounting system is presented. The mounting base may include a pivot mechanism. The pivot mechanism may include a rotating tubular member having a rotating tubular member connection arm coupled to the sensor housing arm. The pivot mechanism may include an extension locking bracket. The sensor mounting system may include a pivot mechanism coupled to a sensor housing arm. The mounting base may include a mounting bracket coupled to the extension locking bracket. The mounting base may include a surface mounting tab and a track clamp mechanism each coupled to the mounting bracket. The surface mounting tab may be configured to be rigidly fixed to a surface and additional mounting security may be provided by a compression force of the track clamp mechanism.

In another aspect, a pivot mechanism is presented. The pivot mechanism may include a rotating tubular member having a rotating tubular member connection arm and a cam surface. The pivot mechanism may include a spring. The pivot mechanism may include a fixed tubular member configured for the rotating tubular member to rotate about. The pivot mechanism may include a return mechanism comprising a roller assembly or a camming surface. The pivot mechanism may be configured to rotate in either an inward direction or in an outward direction by the cam surface moving upwards on the return mechanism thereby compressing the spring.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1A:
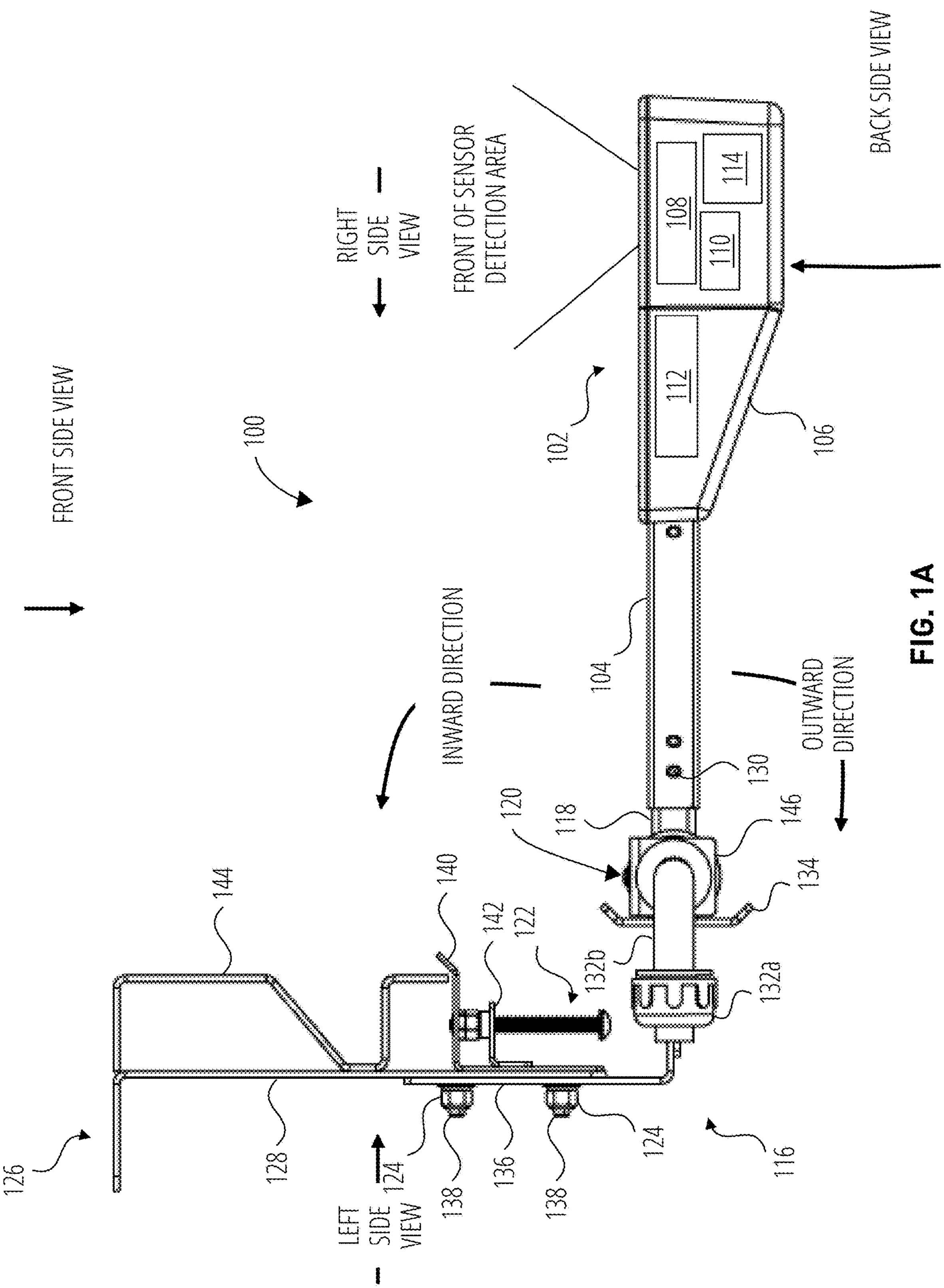
FIG. 1A illustrates a top view of a sensor mounting system in the left-side orientation with a sensor unit in the system initial position in accordance with an embodiment.

This sensor mounting system features a spring-assisted pivot mechanism that allows at least one sensor to automatically return to a system initial position after being displaced by impacts, such as those from forklifts during loading or unloading of a shipping trailer. This unique design eliminates the need for manual adjustments, reducing downtime and enhancing operational efficiency. The robust construction ensures durability and reliability in high-impact environments. The sensor mounting system represents a significant advancement over existing products by combining a robust sensor detection area with automatic system initial position reset, thereby improving safety and workflow efficiency in warehouse operations.

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated. As used in this specification and the claims, unless otherwise stated, the term "about," and "approximately" refers to variations of less than or equal to +/−1%, +/−2%, +/−3%, +/−4%, +/−5%, +/−6%, +/−7%, +/−8%, +/−9%, +/−10%, +/−11%, +/−12%, +/−14%, or +/−15%, depending on the embodiment. As a non-limiting example, about 100 mm represents a range of 95 mm to 105 mm, 90 mm to 112 mm, or 85 mm to 115 mm depending on the embodiments. The term "substantially" refers to less than or equal to +/−1%, +/−2%, +/−3%, +/−4%, +/−5%, +/−6%, +/−7%, +/−8%, +/−9%, +/−10%, +/−11%, +/−12%, +/−14%, or +/−15% variation. As a non-limiting example, substantially parallel represents a range of −1 to 1 degree difference, −5 to 5 degree difference, or −15 degrees to 15 degrees of difference from being parallel, depending on the embodiments. Furthermore, the use of the term "including," as well as other forms, such as "includes" and "included," is not limiting. Additionally, the term "operator" is used to refer to a person. Also, terms such as "element" or "component" encompass both elements or components comprising one unit and elements or components that include more than one unit unless specifically stated otherwise.

The sensor unit can provide sensor data from a sensor detection area which is envisioned to be, but is not limited to, an area inside of a dock door, an area outside of a dock door, an area surrounding a sensor unit mounted to an aisle, an area inside of a shipping trailer, or an area outside of a shipping trailer.

In some embodiments, the sensor mounting system sensor unit is a camera unit. In other embodiments, the sensor mounting system sensor unit can be a thermal imaging camera/sensor, radar/lidar equipment, day/night vision systems, radio technology (a Bluetooth antenna, near-field communication device, a GPS device), a WiFi access point, a time of flight device, scanner, or any other type of sensor. Any type of sensor may be in used in combination with other technologies such as license plate recognition, person counting technology, facial recognition, or any other detection technology.

The sensor unit may be installed and set in a system initial position, and the pivot mechanism may be designed to return the sensor unit to the system initial position immediately after impact without operator interaction or worker intervention. In the primary state, the system initial position is defined as the sensor unit being perpendicular (approximately 90 degrees) relative to a mounting bracket, thus being parallel (approximately 0 degrees) relative to a surface mounting tab. In other variations, in the system initial position, the sensor unit forms approximately an acute angle relative to the mounting bracket, or approximately an obtuse angle relative to the mounting bracket. A back stop attached to the pivot mechanism may prevent the sensor unit from extending beyond approximately 0 degrees or approximately 180 degrees relative to the mounting bracket. It is noted that the track may not be part of the disclosed sensor mounting system.

The sensor mounting system may be installed in either a left-side orientation or a right-side orientation based on the sensor detection area of the sensor unit. The "left-side" or "right-side" designation is made with reference to which side the mounting bracket is to the front of the sensor detection area. In the left-side orientation, as shown in FIG. 1A-FIG. 1I and FIG. 5A-FIG. 5H, the pivot mechanism may rotate the sensor unit in the inward direction (counterclockwise) such that the sensor unit sensor detection area is rotated toward the surface the mounting bracket is installed on. In the left-side orientation, as shown in FIG. 1A-FIG. 1I and FIG. 5A-FIG. 5H, the pivot mechanism may rotate the sensor unit in the outward direction (clockwise) such that the sensor unit sensor detection area is rotated away from the surface the mounting bracket is installed on. In a right-side orientation (not shown), the pivot mechanism may rotate the sensor unit in the inward direction (clockwise) such that the sensor unit sensor detection area is rotated toward the surface the mounting bracket is installed on. In a right-side orientation, the pivot mechanism may rotate the sensor unit in the outward direction (counterclockwise) such that the sensor unit sensor detection area is rotated away from the surface the mounting bracket is installed on.

In the secondary state, a system inward position refers to the position of the sensor unit when the pivot mechanism is fully rotated in the inward direction and the front of the sensor housing arm (the side on which the front of the sensor detection area is located) is touching the back stop, thus the sensor unit is parallel (approximately 0 degrees) relative to the mounting bracket and perpendicular (approximately 90 degrees) relative to the surface mounting tab. In other examples, in a secondary state, the sensor unit is rotated in either the inward direction or outward direction and forms an acute, obtuse, perpendicular, or straight angle relative to the mounting bracket.

In the tertiary state, a system outward position refers to the position of the sensor unit when the pivot mechanism is fully rotated in the outward direction and the back of the sensor housing arm (i.e., the side on which the front of the sensor detection area is not located) is touching the back stop, thus the sensor unit is parallel (approximately 0 degrees) relative to the mounting bracket and perpendicular (approximately 90 degrees) relative to the surface mounting tab. In other examples, in a tertiary state, the sensor unit is rotated in either the inward direction or outward direction and forms an acute, obtuse, perpendicular, or straight angle relative to the mounting bracket.

FIG. 1A illustrates a top view of a sensor mounting system 100 in the left-side orientation with a sensor unit 102 in the system initial position in accordance with an embodiment. The sensor mounting system 100 may include a sensor unit 102 and/or a mounting base 116.

The sensor unit 102 may include a sensor housing arm 104, a sensor housing 106, an image sensor 108, a data transmission circuitry 110, a power supply connection 112, and/or a processor 114.

The mounting base 116 may include a rotating tubular member connection arm 118 (which may be included in a rotating tubular member 148, shown later in FIG. 1C), a pivot mechanism 120, a track securing screw 122, bracket lock nuts 124, a surface mounting tab 126, a mounting bracket 128, sensor housing arm fastener holes 130, a cable conduit 132*a*, a cabling conduit connector 132*b*, a back stop 134, an extension locking bracket 136, mounting bracket protrusions 138, a track clamp mechanism 140, and/or a track securing bracket 142. The mounting base 116 may be configured to couple with a track 144 and a surface (not shown) via the surface mounting tab 126. The track 144 may be positioned on or in an area inside of a dock door, an area outside of a dock door, an area surrounding a sensor unit mounted to an aisle, an area inside of a shipping trailer, or an area outside of a shipping trailer.

The sensor unit 102 may be configured to capture and provide sensor data of a sensor detection area. In some variations of the disclosed subject matter, the sensor unit 102 transmits the sensor data in real time to a computer. The sensor unit 102 is also capable of capturing point-in-time sensor data of the sensor detection area. The sensor unit 102 may include the sensor housing arm 104 and/or the sensor housing 106. In some embodiments, the sensor housing arm 104 is coupled to the rotating tubular member connection arm 118, and may be secured by fasteners that secure the sensor housing arm 104 to the rotating tubular member connection arm 118. Fasteners may be inserted into sensor housing arm fastener holes 130 of the sensor housing arm 104 and rotating tubular member connection arm holes 274 (shown later in FIG. 2) of the rotating tubular member connection arm 118 to couple the rotating tubular member 148 to the sensor housing arm 104. Fasteners may include screws, nails, clips, pins, rivets, or other adjustment mechanisms.

The sensor housing 106 may include the image sensor 108, the data transmission circuitry 110, the power supply connection 112, and/or the processor 114. In an embodiment in which the sensor unit 102 includes a camera unit, the sensor unit 102 may be equipped with a high-resolution wide-angle lens to capture a large sensor detection area. The sensor unit 102 may also be integrated with infrared (IR) LEDs, which are compatible with low-light conditions. The sensor unit 102 may be surrounded by the sensor housing 106, which is may encase the sensor unit 102 in a durable, impact-resistant material. In some cases, the material is plastic. In other cases, the material can be metal, silicone, acrylic, acrylonitrile butadiene styrene (ABS), rubber, rubber-encased plastics, rubber-encased metal, or any other material capable of impact-resistance.

The mounting base 116 may enable the sensor mounting system 100 to be secured to a surface. The mounting base 116 may include the pivot mechanism 120 including the rotating tubular member 148 (shown later in FIG. 1C) having a rotating tubular member connection arm and the extension locking bracket 136, the mounting bracket 128 coupled to the extension locking bracket 136, the surface mounting tab 126 coupled to the mounting bracket 128, and/or the track clamp mechanism 140 coupled to the mounting bracket 128. The pivot mechanism 120 may enable the sensor unit 102 to pivot or rotate in either the outward direction or the inward direction. The pivot mechanism 120 may include the rotating tubular member 148 (shown later in FIG. 1C) having the rotating tubular member connection arm 118 coupled to the sensor unit 102. The rotating tubular member connection arm 118 may be coupled to the sensor housing arm 104 of the sensor unit 102. The mounting bracket 128 may be configured to be rigidly fixed to the surface, using the surface mounting tab 126, with hardware appropriate to the surface and sourced by the customer. Additional mounting security may be provided by a compression force of the track clamp mechanism 140, thereby enabling the sensor unit 102 to capture sensor data of the sensor detection area. The mounting bracket 128 can have a universal configuration that is compatible with various surfaces and door types. The mounting base 116 can be constructed from any material to withstand impacts and vibrations, for example, industrial-grade steel. The mounting bracket 128 may include two mounting bracket protrusions 138, which align with extension locking bracket slots 164 (shown later in FIG. 1C) in the extension locking bracket 136. In the preferred embodiment, the mounting bracket protrusions 138 are threaded. The mounting bracket 128 and extension locking bracket 136 may be fastened using bracket lock nuts 124.

In some embodiments, the pivot mechanism 120 is high-tension and spring-assisted, and is configured to rotate in either the inward direction or in the outward direction in response to a force applied to the rotating tubular member connection arm 118. In other embodiments, the pivot mechanism 120 is a hinge, magnet, or any other type of mechanism that is configured to rotate in response to force applied to the sensor mounting system 100 in either the inward direction or in the outward direction. The pivot mechanism 120 can either use non-electronic or electronic methods to return the sensor unit 102 to the system initial position. The pivot mechanism 120 may also have its own attached sensor (not shown). In the exemplary embodiment, the pivot mechanism 120 may include a spring 150 (shown later in FIG. 1C), a fixed tubular member 156 (shown later in FIG. 1C), a cam surface 162 (shown later in FIG. 1C), a roller assembly 160 (shown later in FIG. 1C), a compression clip 146, and/or a washer 168 (shown later in FIG. 1C). The pivot mechanism 120 is fixed, but can be made to be field adjustable to ensure precise calibration of the sensor detection area of the sensor unit 102.

The track securing screw 122 may provide lateral support to the mounting bracket 128 through an opening in the track securing bracket 142. The track securing screw 122 may ensure the mounting bracket 128 aligns with and secures to the track 144. The track clamp mechanism 140 can be coupled to the mounting bracket 128 using fasteners such as pan-head screws 599 (shown later in FIG. 5E). The track clamp mechanism 140 may provide additional mounting security using a compression force to maintain the sensor unit 102 at a predetermined sensor detection area and to support and stabilize and prevent movement of the sensor mounting system 100.

The cable conduit 132*a* and the cabling conduit connector 132*b* may connect to the power supply connection 112 for purposes including but not limited to power, ethernet, and data transmission. Any of the electrical components may include safety features such as surge protection and power backup.

Figure 1B:
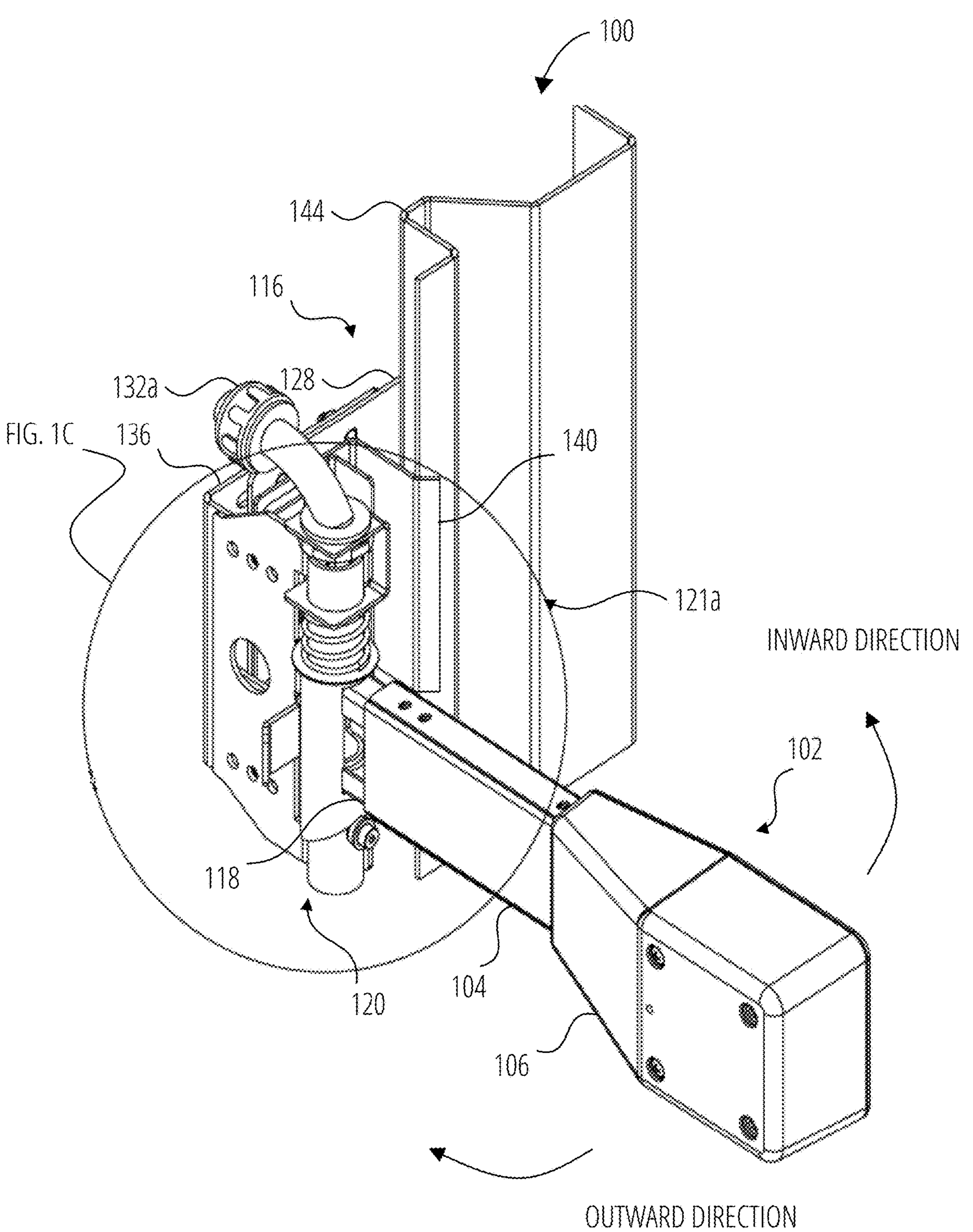
FIG. 1B illustrates an isometric view of a sensor mounting system in the left-side orientation with a sensor unit in the system initial position in accordance with an embodiment.

FIG. 1B illustrates an isometric view of the sensor mounting system 100 in the left-side orientation with the sensor unit 102 in the system initial position in accordance with an embodiment. The sensor mounting system 100 may include the sensor unit 102 and/or the mounting base 116. The sensor unit 102 may include the sensor housing arm 104 and the sensor housing 106. The mounting base 116 may include the rotating tubular member connection arm 118, the pivot mechanism 120, the mounting bracket 128, the cable conduit 132*a*, the extension locking bracket 136, and/or the track clamp mechanism 140. The sensor mounting system 100 may also include an exemplary view 121*a* with the pivot mechanism 120.

In FIG. 1B, the sensor mounting system 100 is shown with the sensor unit 102 in its system initial position. The pivot mechanism 120 enables the sensor unit 102 to rotate in either an outward direction or an inward direction. The inward direction is toward the track 144, while the outward direction is away from the track 144. Alternatively, the sensor mounting system 100 can be installed on a right-side orientation.

Also shown is the mounting base 116 secured to the track 144 via the track clamp mechanism 140. The mounting base 116 as is shown in other examples, also includes the surface mounting tab 126 (shown in FIG. 1A) that is configured to be rigidly fixed to the surface.

Figure 1C:
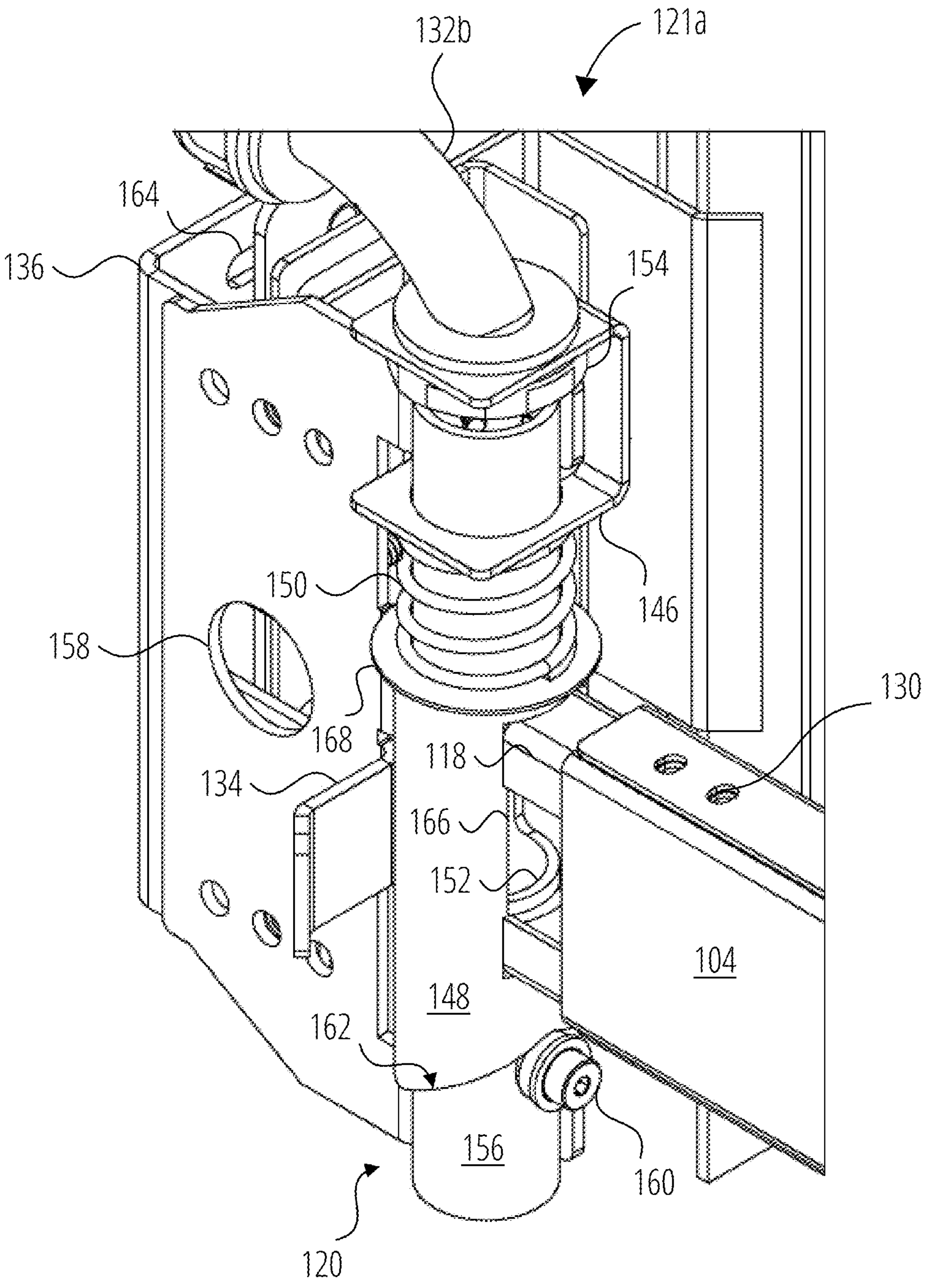
FIG. 1C illustrates an exemplary view with a pivot mechanism in the left-side orientation with a sensor unit in the system initial position in accordance with an embodiment.

FIG. 1C illustrates the exemplary view 121*a* with the pivot mechanism 120 in the left-side orientation with the sensor unit 102 in the system initial position in accordance with an embodiment. The exemplary view 121*a* may include the sensor housing arm 104, the rotating tubular member connection arm 118, the pivot mechanism 120, the cabling conduit connector 132*b*, the back stop 134, and/or the extension locking bracket 136. The exemplary view 121*a* may include the sensor housing arm fastener holes 130, the compression clip 146, a rotating tubular member 148, a spring 150, a fixed tubular member opening 152, a conduit connector lock nut 154, a fixed tubular member 156, a track securing screw access hole 158, a roller assembly 160, a cam surface 162, an extension locking bracket slot 164, a rotating tubular member opening 166, and/or a washer 168.

The pivot mechanism 120 may include the rotating tubular member connection arm 118, the extension locking bracket 136, the rotating tubular member 148, the spring 150, the fixed tubular member 156, the return mechanism (in this embodiment, the roller assembly 160), and/or the cam surface 162. In other embodiments, the return mechanism may be a camming surface 380 (shown later in FIG. 3A). The return mechanism, which may be either a roller assembly 160 or a camming surface 380, may be configured to interact with the cam surface 162 of the rotating tubular member 148. In an embodiment, the spring 150 is decompressed and thus, the sensor unit 102 is in the system initial position. In another embodiment, the sensor unit 102 is in the system initial position when the spring 150 is preloaded. The preloading of spring 150 may ensure continuous contact between the return mechanism and the cam surface, resulting in more controlled movement of the system. The amount of preload compression can vary significantly, based on factors such as the spring rate, spring length, and the maximum allowable compression, referred to as the "solid height," during operation.

The spring 150, the fixed tubular member 156, the roller assembly 160, and/or the cam surface 162 may be configured to enable the rotating tubular member connection arm 118 to rotate in either the inward direction or the outward direction. In response to a force applied to the front side of the sensor unit 102 that pushes the sensor unit 102 from the system initial position in the outward direction, the cam surface 162 may roll upwards on the roller assembly 160, thereby compressing the spring 150. After the force applied to the front side of the sensor unit 102 is removed, the pivot mechanism 120 may be operable to return the sensor unit 102 to the system initial position, wherein the spring 150 may decompress by the downwards roll of the cam surface 162 on the roller assembly 160. When the pivot mechanism 120 rotates, the spring 150 may be compressed between the compression clip 146 and the washer 168. The washer 168 may maintain the position of the spring 150 above the rotating tubular member 148.

In response to a force applied to a back side of the sensor unit 102 that pushes the sensor unit 102 from the system initial position in the inward direction, the cam surface 162 may roll upwards on the roller assembly 160, thereby compressing the spring 150. After the force applied to the back side of the sensor unit 102 is removed, the pivot mechanism 120 may be operable to return the sensor unit 102 to the system initial position, wherein the spring 150 decompresses by the downwards roll of the cam surface 162 on the roller assembly 160.

The track securing screw 122 (shown in FIG. 1A) may be accessible via the track securing screw access hole 158. The track securing screw 122 may be used to tighten the track clamp mechanism 140 on the track 144.

Both the rotating tubular member 148 and the fixed tubular member 156 may be hollow. The rotating tubular member 148 may include the rotating tubular member opening 166, and the fixed tubular member 156 may include the fixed tubular member opening 152. The fixed tubular member 156 may include a smaller outer diameter than the inner diameter of the rotating tubular member 148, and thus the fixed tubular member 156 may be positioned within the rotating tubular member 148. The rotating tubular member 148 may be configured to rotate about the fixed tubular member 156. The rotating tubular member 148 may be configured to rest against the roller assembly 160 during any stage of compression of the spring 150. In some embodiments, the pivot mechanism 120 is connected to the cabling conduit connector 132*b* configured to align with the fixed tubular member 156 and enable electrical power to be provided to the power supply connection 112 (shown in FIG. 1A). This may be accomplished by the fixed tubular member opening 152 and the rotating tubular member opening 166 overlapping such that wiring to connect the power supply connection 112 (shown in FIG. 1A) may be passed from the cabling conduit connector 132*b* and through the fixed tubular member 156, the fixed tubular member opening 152, the rotating tubular member opening 166, and/or the sensor housing arm 104.

Figure 1D:
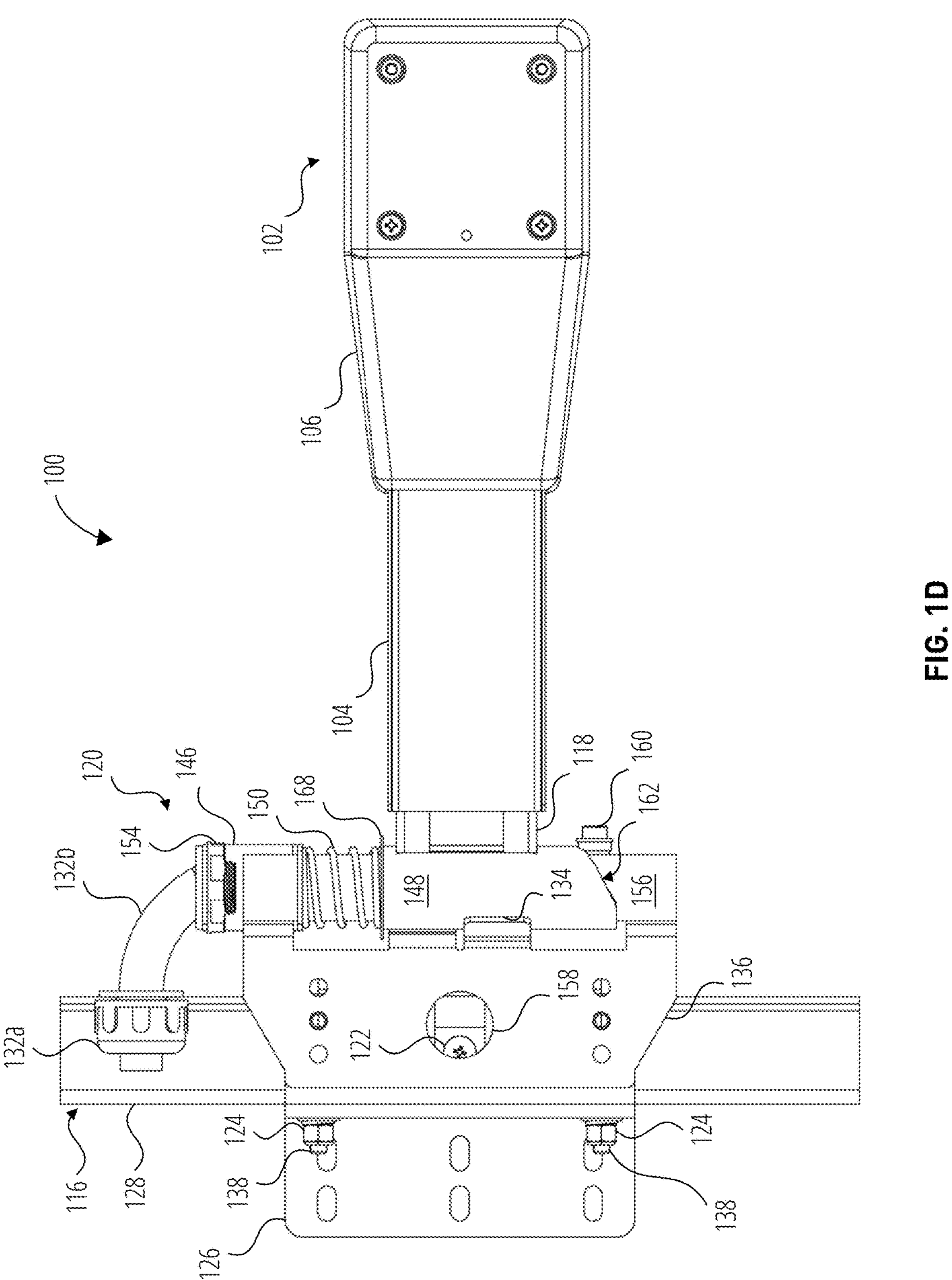
FIG. 1D illustrates a back side view of a sensor mounting system in the left-side orientation with a sensor unit in the system initial position in accordance with an embodiment.

FIG. 1D illustrates a back side view of the sensor mounting system 100 in the left-side orientation with the sensor unit 102 in the system initial position in accordance with an embodiment.

The sensor mounting system 100 may include the sensor unit 102, the sensor housing arm 104, the sensor housing 106, the mounting base 116, the rotating tubular member connection arm 118, the pivot mechanism 120, the track securing screw 122, the bracket lock nuts 124, the surface mounting tab 126, the mounting bracket 128, the cable conduit 132*a*, the cabling conduit connector 132*b*, the back stop 134, the extension locking bracket 136, the mounting bracket protrusions 138, the compression clip 146, the rotating tubular member 148, the spring 150, the conduit connector lock nut 154, the fixed tubular member 156, the track securing screw access hole 158, the roller assembly 160, the cam surface 162, and/or the washer 168.

In this perspective, both the track securing screw 122 and the track securing screw access hole 158 are viewable and accessible. A user is able to access the track securing screw 122 via the track securing screw access hole 158 to adjust the track securing bracket 142 (shown later in FIG. 1E). Also depicted is a different perspective of the mounting bracket protrusions 138 and the bracket lock nuts 124. In the exemplary embodiment, the mounting bracket protrusions 138 and bracket lock nuts 124 are threaded, but any kind of fastener combination may also be used.

Figure 1E:
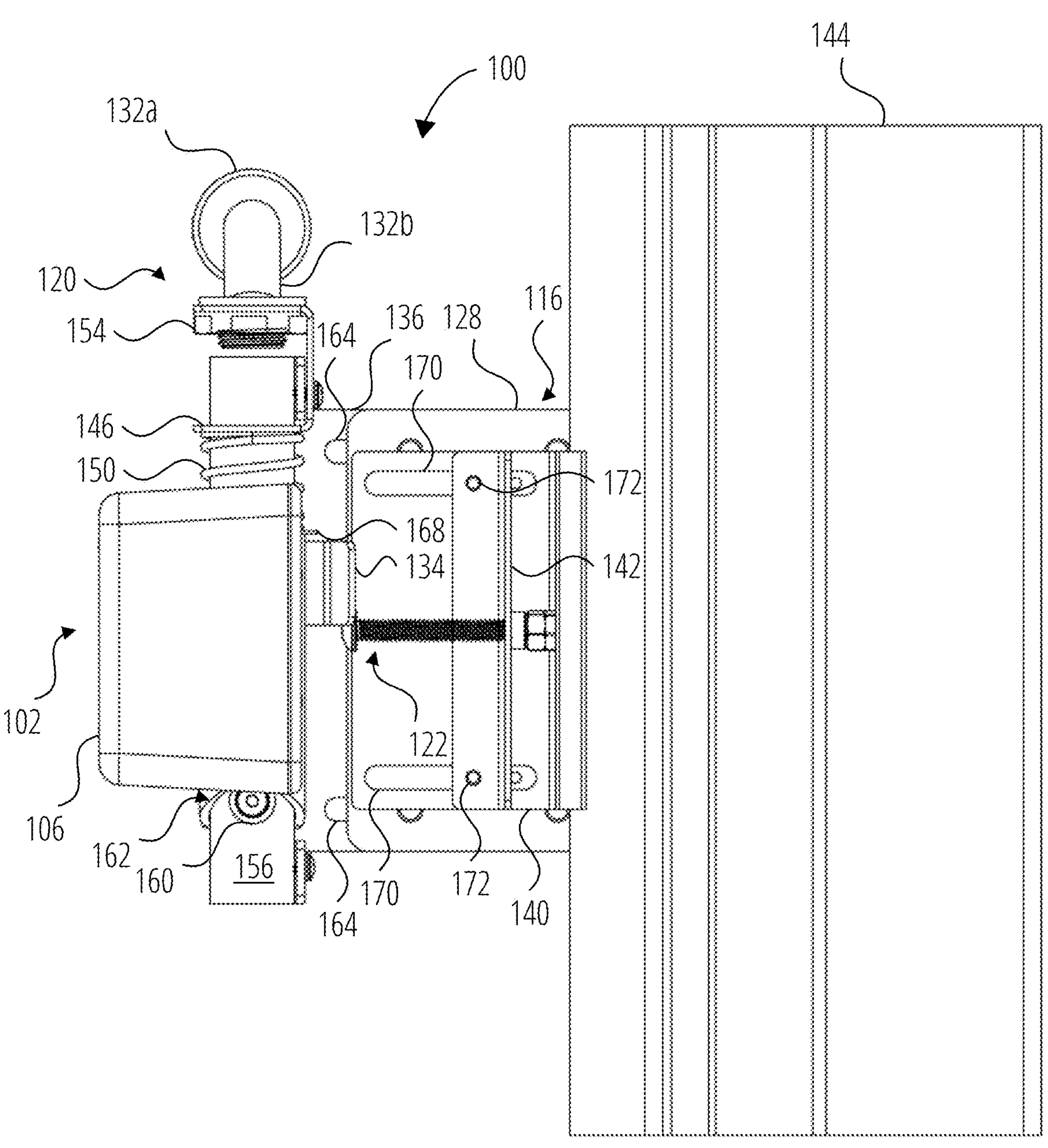
FIG. 1E illustrates a right side view of a sensor mounting system in the left-side orientation with a sensor unit in the system initial position in accordance with an embodiment.

FIG. 1E illustrates a right side view of the sensor mounting system 100 in the left-side orientation with the sensor unit 102 in the system initial position in accordance with an embodiment. The sensor mounting system 100 may include the sensor unit 102, the sensor housing 106, the mounting base 116, the pivot mechanism 120, the track securing screw 122, the mounting bracket 128, the cable conduit 132*a*, the cabling conduit connector 132*b*, the back stop 134, the extension locking bracket 136, the track clamp mechanism 140, the track securing bracket 142, the track 144, the compression clip 146, the spring 150, the conduit connector lock nut 154, the fixed tubular member 156, the roller assembly 160, the cam surface 162, the extension locking bracket slots 164, and/or the washer 168. The sensor mounting system 100 may include track securing bracket slots 170 and/or pan-head screw holes 172.

The extension locking bracket 136 may include the extension locking bracket slots 164 which align with the mounting bracket protrusions 138 (shown in FIG. 1A) of the mounting bracket 128. The extension locking bracket slots 164 along the length of the extension locking bracket 136 may allow the length of the sensor mounting system 100 to be customized to the needs of the user.

The track clamp mechanism 140 may include the track securing screw 122, the track securing bracket 142, and/or the track securing bracket slots 170 to couple to the mounting bracket 128. The track clamp mechanism 140 coupled to the mounting base 116 may enable alignment of the track 144. Pan-head screws 599 (shown later in FIG. 5E) may be used to couple the track clamp mechanism 140 through the pan-head screw holes 172, or other types of fasteners may be used such as clips, pins, rivets, or other adjustment mechanisms.

Figure 1F:
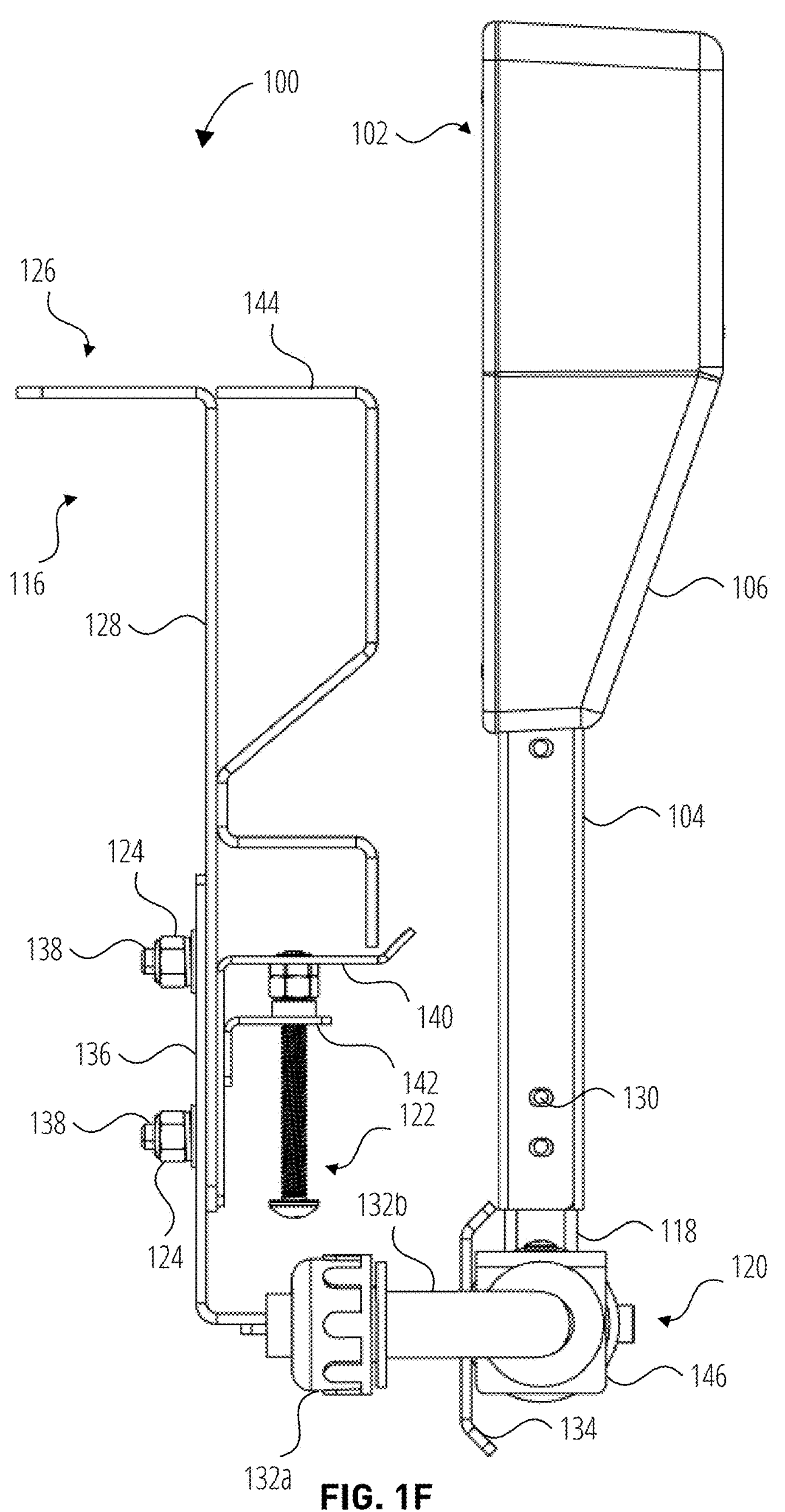
FIG. 1F illustrates a top view of a sensor mounting system in the left-side orientation with a sensor unit in the system inward position in accordance with an embodiment.

FIG. 1F illustrates a top view of the sensor mounting system 100 in the left-side orientation with the sensor unit 102 in the system inward position in accordance with an embodiment. The sensor mounting system 100 may include the sensor unit 102, the sensor housing arm 104, the sensor housing 106, the mounting base 116, the rotating tubular member connection arm 118, the pivot mechanism 120, the track securing screw 122, the bracket lock nuts 124, the surface mounting tab 126, the mounting bracket 128, the sensor housing arm fastener holes 130, the cable conduit 132*a*, the cabling conduit connector 132*b*, the back stop 134, the extension locking bracket 136, the mounting bracket protrusion 138, the track clamp mechanism 140, the track securing bracket 142, the track 144, and/or the compression clip 146.

The system inward position embodiment may be immediately after the back side of the sensor unit 102 has been impacted which causes the pivot mechanism 120 to rotate in the inward direction, and immediately before the pivot mechanism 120 rotates in the outward direction to return the sensor unit 102 to the system initial position.

Figure 1G:
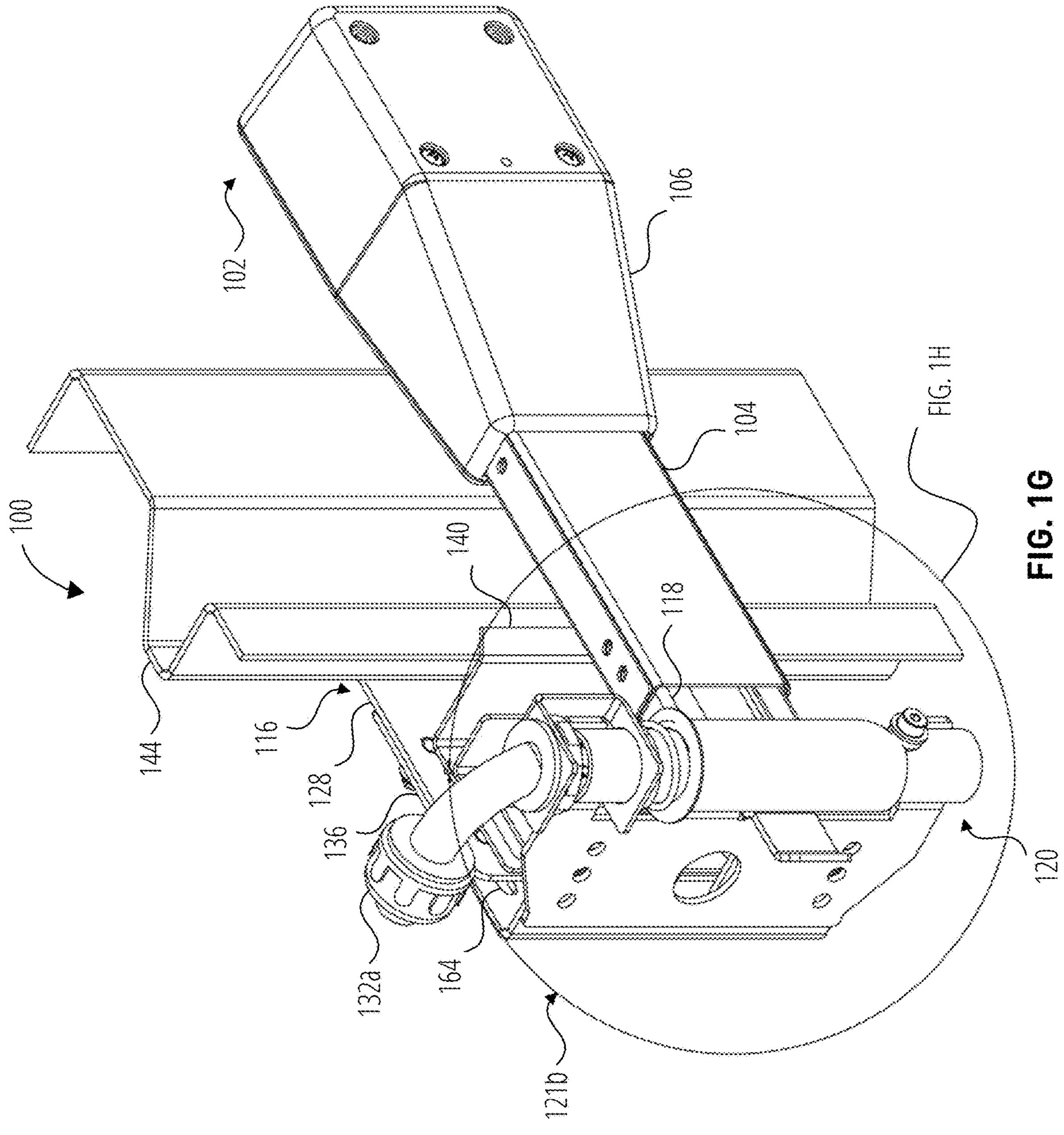
FIG. 1G illustrates an isometric view of a sensor mounting system in the left-side orientation with a sensor unit in the system inward position in accordance with an embodiment.

FIG. 1G illustrates an isometric view of the sensor mounting system 100 in the left-side orientation with the sensor unit 102 in the system inward position in accordance with an embodiment. The sensor mounting system 100 may include the sensor unit 102, the sensor housing arm 104, the sensor housing 106, the mounting base 116, the rotating tubular member connection arm 118, the pivot mechanism 120, the mounting bracket 128, the cable conduit 132*a*, the extension locking bracket 136, the track clamp mechanism 140, the track 144, and/or the extension locking bracket slot 164. The sensor mounting system 100 may also include an exemplary view 121*b* with the pivot mechanism 120.

This view shows a state of the pivot mechanism 120 when the sensor unit 102 is fully rotated in the inward direction. The sensor mounting system 100 in this view includes the sensor unit 102 (including the sensor housing arm 104 and the sensor housing 106) substantially parallel to the track 144. The mounting base 116 may be secured to the track 144 and a surface (not shown).

The mounting bracket 128, the cable conduit 132*a*, the extension locking bracket 136, the track clamp mechanism 140, and/or the extension locking bracket slot 164 may all remain stationary. The state of the pivot mechanism 120 is described in more detail with reference to FIG. 1H.

Figure 1H:
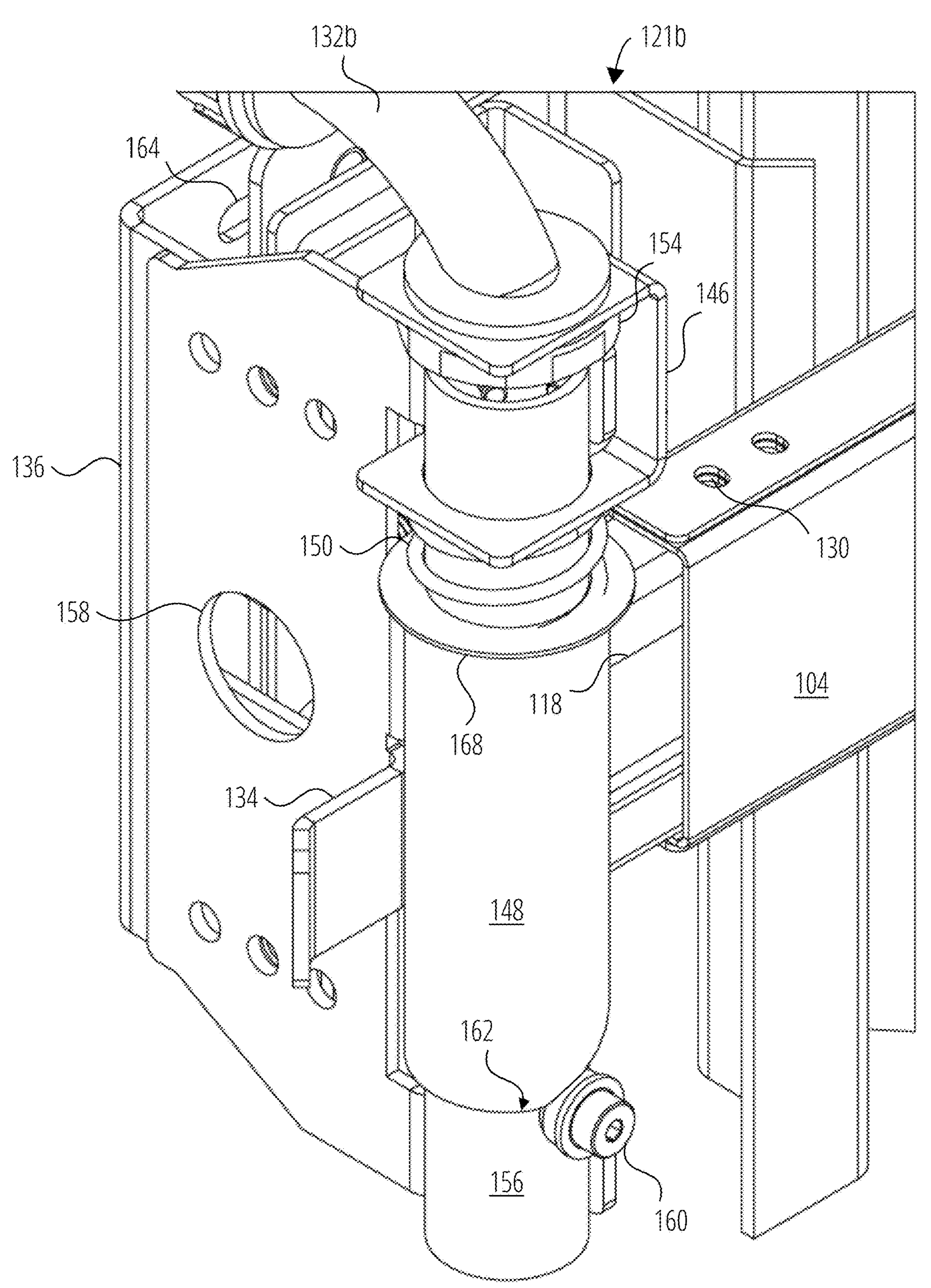
FIG. 1H illustrates an exemplary view with a pivot mechanism in the left-side orientation with a sensor unit in the system inward position in accordance with an embodiment.

FIG. 1H illustrates the exemplary view 121*b* with the pivot mechanism 120 in the left-side orientation with the sensor unit 102 in the system inward position in accordance with an embodiment. The exemplary view 121*b* may include the sensor housing arm 104, the rotating tubular member connection arm 118, the pivot mechanism 120, the sensor housing arm fastener holes 130, the cabling conduit connector 132*b*, the back stop 134, and/or the extension locking bracket 136, the compression clip 146, the rotating tubular member 148, the spring 150, the fixed tubular member opening 152, the conduit connector lock nut 154, the fixed tubular member 156, the track securing screw access hole 158, the roller assembly 160, the cam surface 162, the extension locking bracket slot 164, and/or the washer 168.

In the exemplary embodiment, the back side of the sensor unit 102 has received a force which causes the pivot mechanism 120 to rotate in the inward direction. Specifically, the rotating tubular member connection arm 118 is impacted by the force, which may cause the rotation of the pivot mechanism 120. The cam surface 162 may roll upwards on the roller assembly 160, thereby compressing the spring 150 between the compression clip 146 and the washer 168. When the force applied to the back side of the sensor unit 102 is removed, the pivot mechanism 120 may be operable to return the sensor unit 102 to the system initial position without operator interaction, wherein the spring 150 decompresses between the compression clip 146 and the washer 168 by the downwards roll of the cam surface 162 on the roller assembly 160.

Figure 1I:
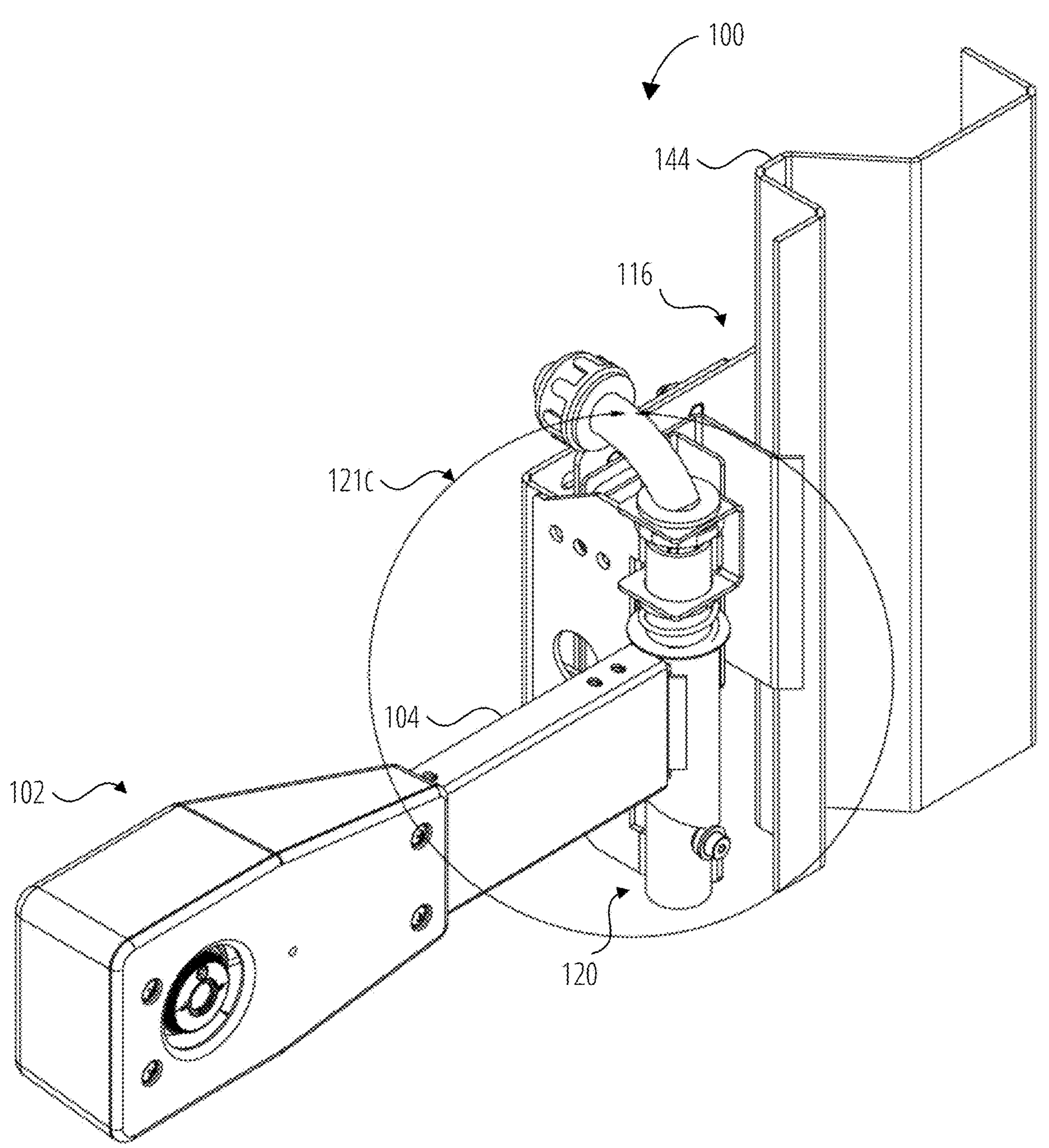
FIG. 1I illustrates an isometric view of a sensor mounting system in the left-side orientation with a sensor unit in the system outward position in accordance with an embodiment.

FIG. 1I illustrates an isometric view of the sensor mounting system 100 in the left-side orientation with the sensor unit 102 in the system outward position in accordance with an embodiment. The sensor mounting system 100 may include an exemplary view 121*c* with the pivot mechanism 120. The features of FIG. 1I remain the same as the features of FIG. 1A-FIG. 1H.

In the exemplary embodiment, the front side of the sensor unit 102 has received a force which causes the pivot mechanism 120 to rotate in the outward direction. Specifically, the rotating tubular member connection arm 118 is impacted by the force, which may cause the rotation of the pivot mechanism 120. The cam surface 162 may roll upwards on the roller assembly 160, thereby compressing the spring 150 between the compression clip 146 and the washer 168. When the force applied to the front side of the sensor unit 102 is removed, the pivot mechanism 120 may be operable to return the sensor unit 102 to the system initial position as the spring decompresses between the compression clip 146 and the washer 168 by the downwards roll of the cam surface 162 on the roller assembly 160.

Figure 2:
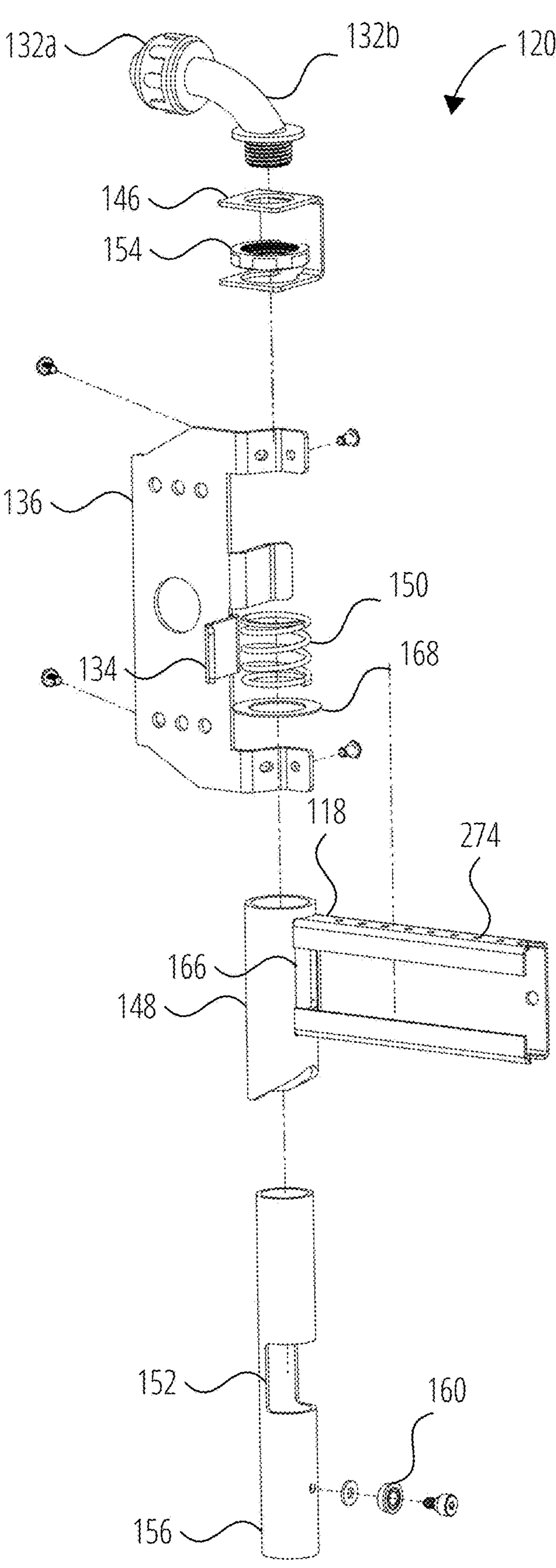
FIG. 2 illustrates an exploded isometric view of a pivot mechanism in accordance with an embodiment.

FIG. 2 illustrates an exploded isometric view of the pivot mechanism 120 in accordance with an embodiment. The pivot mechanism 120 may include the rotating tubular member connection arm 118, the cable conduit 132*a*, the cabling conduit connector 132*b*, the back stop 134, the extension locking bracket 136, the rotating tubular member 148, the spring 150, the fixed tubular member opening 152, the conduit connector lock nut 154, the fixed tubular member 156, the roller assembly 160, the rotating tubular member opening 166, the compression clip 146, the washer 168, and/or rotating tubular member connection arm holes 274. In the exemplary figure, the respective individual components of the pivot mechanism 120 and their relationship to one another are easily viewable and understood. Fasteners may be inserted into the sensor housing arm fastener holes 130 (shown in FIG. 1A) of the sensor housing arm 104 (shown in FIG. 1A) and the rotating tubular member connection arm holes 274 to couple the rotating tubular member 148 to the sensor housing arm 104.

Figure 3A:
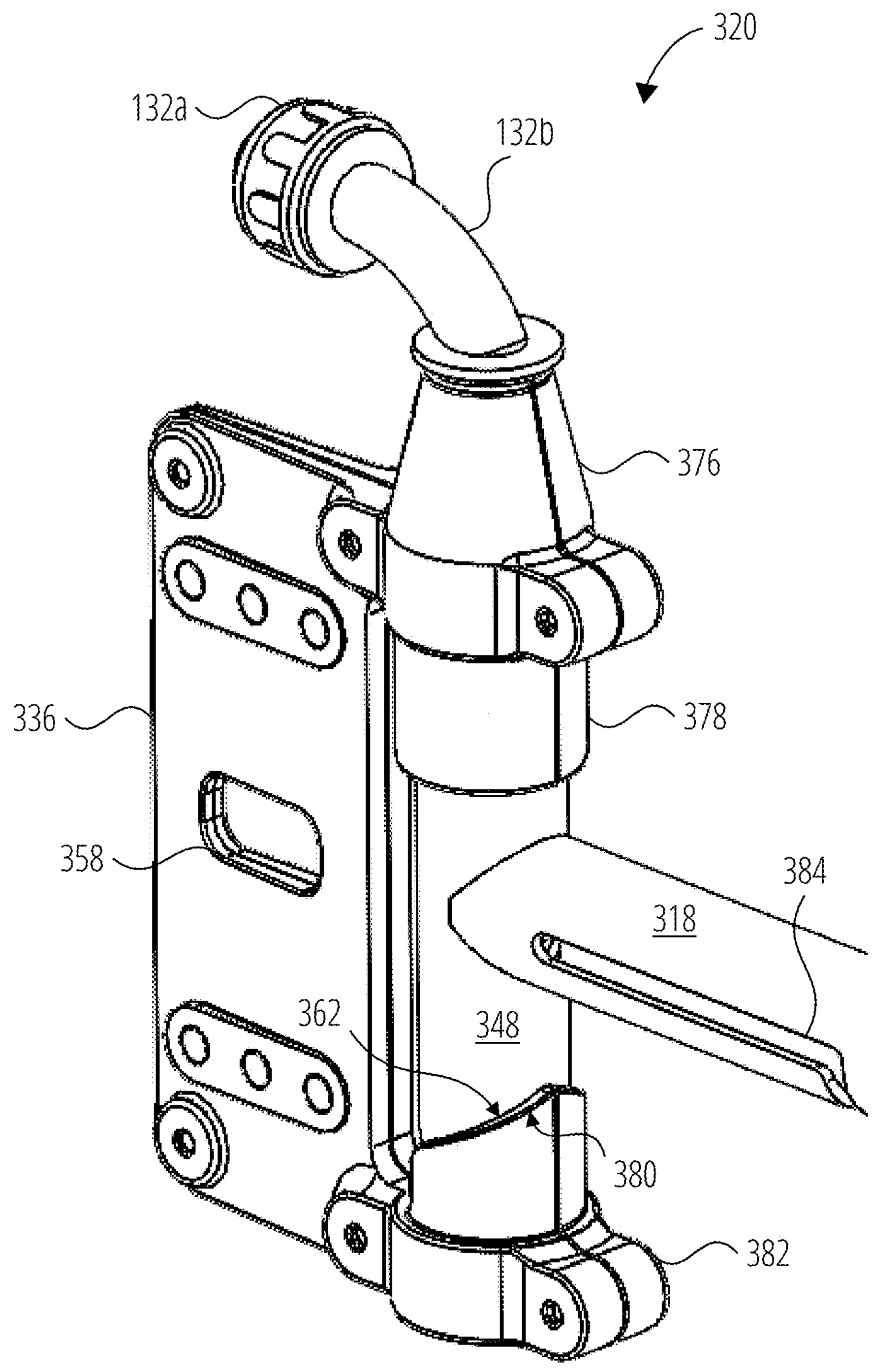
FIG. 3A illustrates an isometric view of a pivot mechanism in the left-side orientation with a sensor unit in the system initial position in accordance with an embodiment.

FIG. 3A illustrates an isometric view of a pivot mechanism 320 in the left-side orientation with the sensor unit in the system initial position in accordance with an embodiment. The pivot mechanism 320 may include the cable conduit 132*a* and the cabling conduit connector 132*b*. The pivot mechanism 320 may include a rotating tubular member connection arm 318, an extension locking bracket 336, a rotating tubular member 348, a track securing screw access hole 358, a cam surface 362, a frustum 376, a spring cover 378, a camming surface 380, and/or a camming surface base 382. Figure parts 318, 320, 336, 358, and/or 362 in this figure correspond in function to their respective parts in FIG. 1A-FIG. 2 (i.e., the rotating tubular member connection arm 318 in FIG. 3A is the same type of part as the rotating tubular member connection arm 118 in FIG. 1A, the pivot mechanism 320 of FIG. 3A is the same type of part as the pivot mechanism 120 in FIG. 1A, etc.). Parts shown in FIG. 1A-FIG. 2 that are part of the sensor mounting system 100 but are not shown in this figure may remain the same.

In this embodiment, the spring 150 and the washer 168 as shown in FIG. 1C are hidden from view by the spring cover 378. The compression clip 146 and the conduit connector lock nut 154 as shown in FIG. 1C are hidden from view by the frustum 376. The fixed tubular member 156 as shown in FIG. 1C is hidden from view by the camming surface base 382, which includes the camming surface 380. Instead of the roller assembly 160 for the return mechanism, as shown in FIG. 1C, FIG. 3A utilizes the camming surface 380 to interact with the cam surface 362. The function of the camming surface 380 with the cam surface 362 is described in further detail with reference to FIG. 3B.

The rotating tubular member connection arm 318 may include the rotating tubular member fastener slot 384, which may be configured to connect the rotating tubular member connection arm 318 and a sensor housing arm 504 (shown later in FIG. 5A) through the use of one or more fasteners.

Figure 3B:
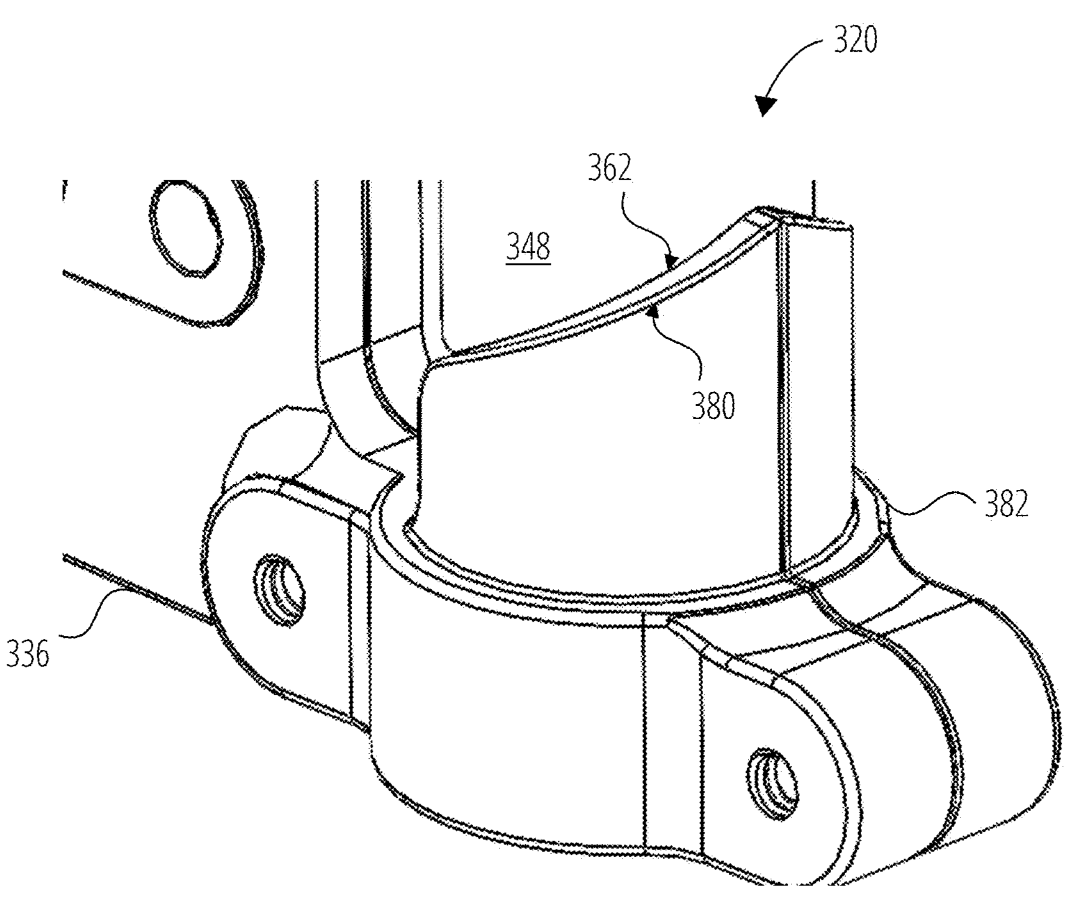
FIG. 3B illustrates a detailed isometric view of a pivot mechanism in the left-side orientation with a sensor unit in the system initial position in accordance with an embodiment.

FIG. 3B illustrates a detailed isometric view of the pivot mechanism 320 in the left-side orientation with the sensor unit in the system initial position in accordance with an embodiment. The pivot mechanism 320 may include the extension locking bracket 336, the rotating tubular member 348, the cam surface 362, the camming surface 380, and/or the camming surface base 382.

The pivot mechanism 320 may include the spring 150 (shown in FIG. 1C), the fixed tubular member 156 (shown in FIG. 1C), the return mechanism (in this embodiment, the camming surface 380), and/or the cam surface 362. In other embodiments, the return mechanism may be the roller assembly 160 (shown in FIG. 1C). The camming surface 380 may be configured to interact with the cam surface 362 of the rotating tubular member 348. In an embodiment, the spring 150 is decompressed and thus, the sensor unit 102 (shown in FIG. 1A) is in the system initial position. In another embodiment, the sensor unit 102 is in the system initial position when the spring 150 is preloaded. The spring 150 may be compressed in ranges of 1-5%, 5-10%, 10-15%, greater than 15%, or any other range, in this embodiment or other embodiments.

The spring 150, the fixed tubular member 156, the camming surface 380, and/or the cam surface 362 may be configured to enable the rotating tubular member connection arm 318 to rotate in either the inward direction or the outward direction (without operator interaction). In response to a force applied to the front side of the sensor unit 102 that pushes the sensor unit 102 from the system initial position in the outward direction, the cam surface 362 may move upwards on the camming surface 380, thereby compressing the spring 150. After the force applied to the front side of the sensor unit 102 is removed, the pivot mechanism 320 may be operable to return the sensor unit 102 to the system initial position, wherein the spring 150 may decompress by the downwards roll of the cam surface 362 on the camming surface 380. When the pivot mechanism 320 rotates, the spring 150 may be compressed between the compression clip 146 and the washer 168 (shown in FIG. 1C). The washer 168 may maintain the position of the spring 150 above the rotating tubular member 348.

In response to a force applied to a back side of the sensor unit 102 that pushes the sensor unit 102 from the system initial position in the inward direction, the cam surface 362 may move upwards on the camming surface 380, thereby compressing the spring 150. After the force applied to the back side of the sensor unit 102 is removed, the pivot mechanism 320 may be operable to return the sensor unit 102 to the system initial position, wherein the spring 150 may decompress by the downwards movement of the cam surface 362 on the camming surface 380.

The track securing screw 122 (shown in FIG. 1A) may be accessible via the track securing screw access hole 358. The track securing screw 122 may be used to tighten the track clamp mechanism 140 (shown in FIG. 1A) on the track 144 (shown in FIG. 1A).

Both the rotating tubular member 348 and the fixed tubular member 156 may be hollow. In the example, the fixed tubular member 156 may include a smaller outer diameter than the inner diameter of the rotating tubular member 348, and thus the fixed tubular member 156 may be positioned within the rotating tubular member 348. The rotating tubular member 348 may be configured to rotate about the fixed tubular member 156. The rotating tubular member 348 may be configured to rest against the camming surface 380 during any stage of compression of the spring 150. In some embodiments, the pivot mechanism 320 is connected to the cabling conduit connector 132*b* (shown in FIG. 1A) configured to align with the fixed tubular member 156 and enable electrical power to be provided to the power supply connection 112 (shown in FIG. 1A) from the cable conduit 132*a*. This may be accomplished by the fixed tubular member opening 152 (shown in FIG. 1C) and the rotating tubular member opening 166 (shown in FIG. 1C) overlapping such that wiring (not shown) to connect the power supply connection 112 is passed from the cabling conduit connector 132*b* (shown in FIG. 3A) and through the fixed tubular member 156, the fixed tubular member opening 152, the rotating tubular member opening 166, and/or the sensor housing arm 504 (shown in FIG. 5A).

Figure 3C:
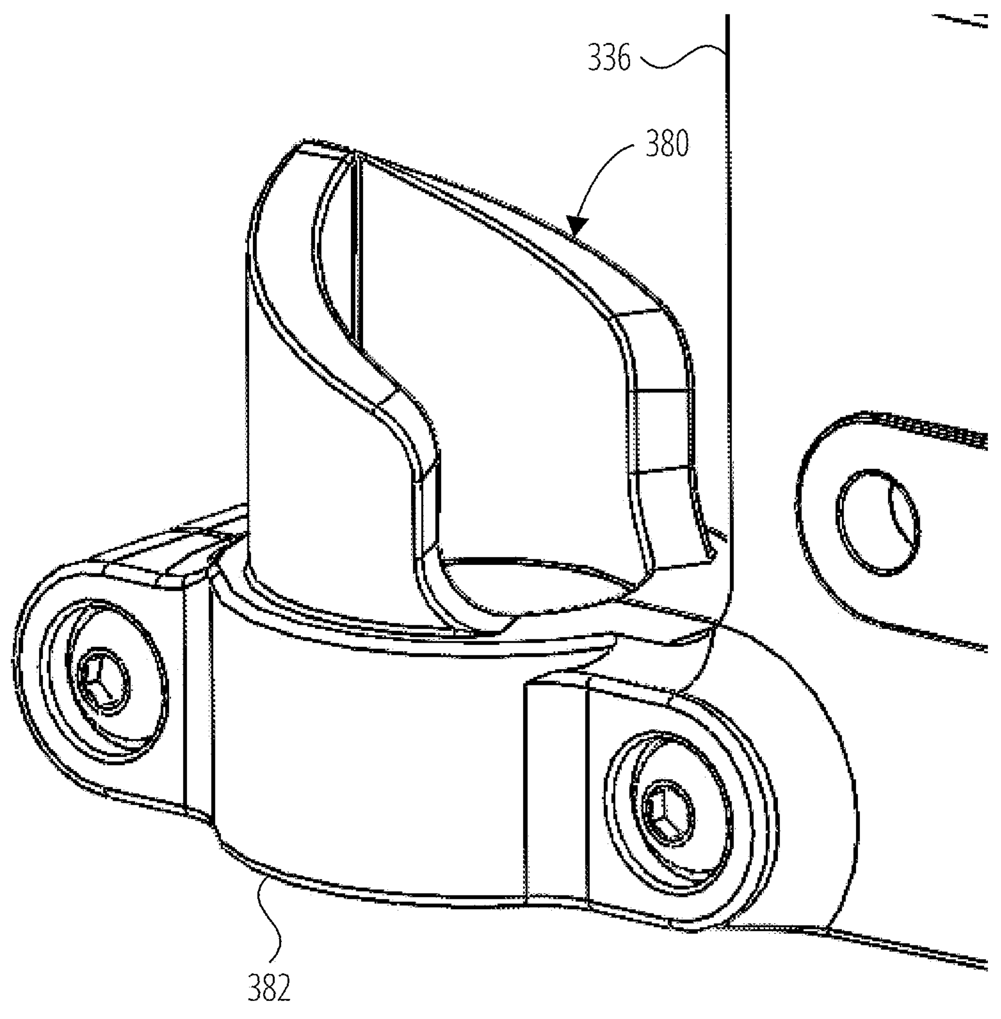
FIG. 3C illustrates a detailed isometric view of a camming surface of a pivot mechanism in accordance with an embodiment.

FIG. 3C illustrates a detailed isometric view of the camming surface 380 of the pivot mechanism 320 in accordance with an embodiment. The figure includes the extension locking bracket 336, the camming surface 380, and the camming surface base 382.

In this view, the rotating tubular member 348 (shown in FIG. 3A) and fixed tubular member 156 (shown in FIG. 1A) are not shown, allowing for the form of the camming surface 380 to be viewed. The camming surface 380 may be smooth, allowing for movement (e.g., slipping, sliding, or rolling) when in contact with the cam surface 362 (shown in FIG. 3A). In the figure shown, the camming surface 380 shape is similar to an hourglass with a pointed tip. In other embodiments, the camming surface 380 may be round, oval, elliptical, or any other shape.

Figure 4A:
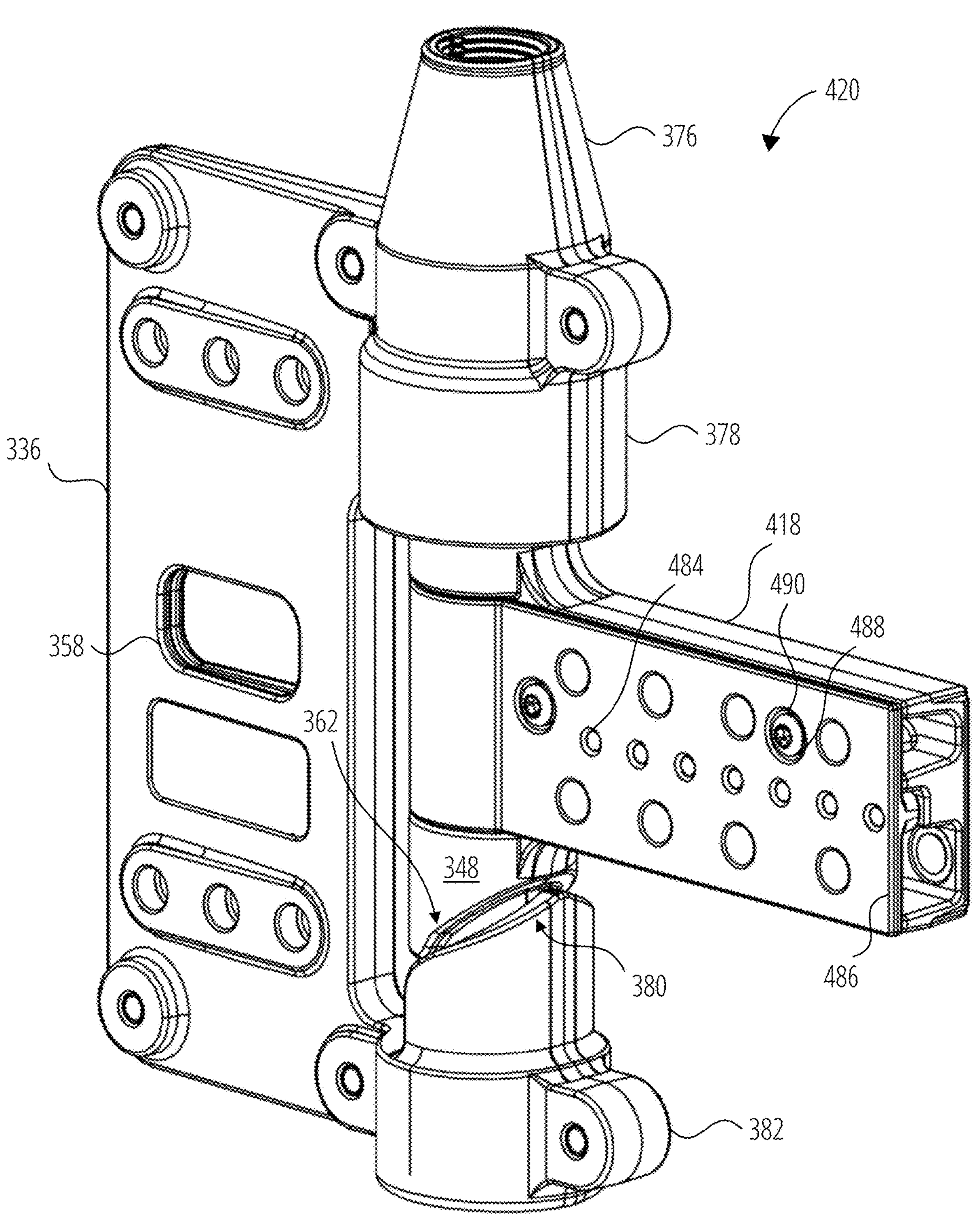
FIG. 4A illustrates an isometric view of a pivot mechanism in accordance with an embodiment.

FIG. 4A illustrates an isometric view of a pivot mechanism 420 in accordance with an embodiment. The pivot mechanism 420 may include the extension locking bracket 336, the rotating tubular member 348, the track securing screw access hole 358, the cam surface 362, the frustum 376, the spring cover 378, the camming surface 380, and/or the camming surface base 382. The pivot mechanism 420 may include a rotating tubular member connection arm 418, a rotating tubular member connection arm front plate 486, rotating tubular member connection arm front plate fasteners 488, rotating tubular member front plate fastener holes 490, and/or rotating tubular member fastener holes 484. Figure parts 418 and 484 in this figure correspond in function to their respective parts in FIG. 1A-FIG. 3C (i.e., the rotating tubular member connection arm 418 in FIG. 4A is the same type of part as the rotating tubular member connection arm 118 in FIG. 1A, and the rotating tubular member fastener holes 484 are the same type of part as the rotating tubular member fastener slot 384 in FIG. 3A). Parts shown in FIG. 1A-FIG. 3C that are part of the sensor mounting system 100 and/or the pivot mechanism 320 but are not shown in this figure may remain the same.

The rotating tubular member connection arm front plate 486 may include a piece of material (such as a metal) to cover internal components of the rotating tubular member connection arm 418. The rotating tubular member connection arm front plate fasteners 488 may insert through the rotating tubular member front plate fastener holes 490 to couple the rotating tubular member connection arm front plate 486 to the rotating tubular member connection arm 418. The rotating tubular member fastener holes 484 may allow for fasteners to insert through to couple a sensor housing arm 504 (shown later in FIG. 5A) to the rotating tubular member connection arm 418.

Figure 4B:
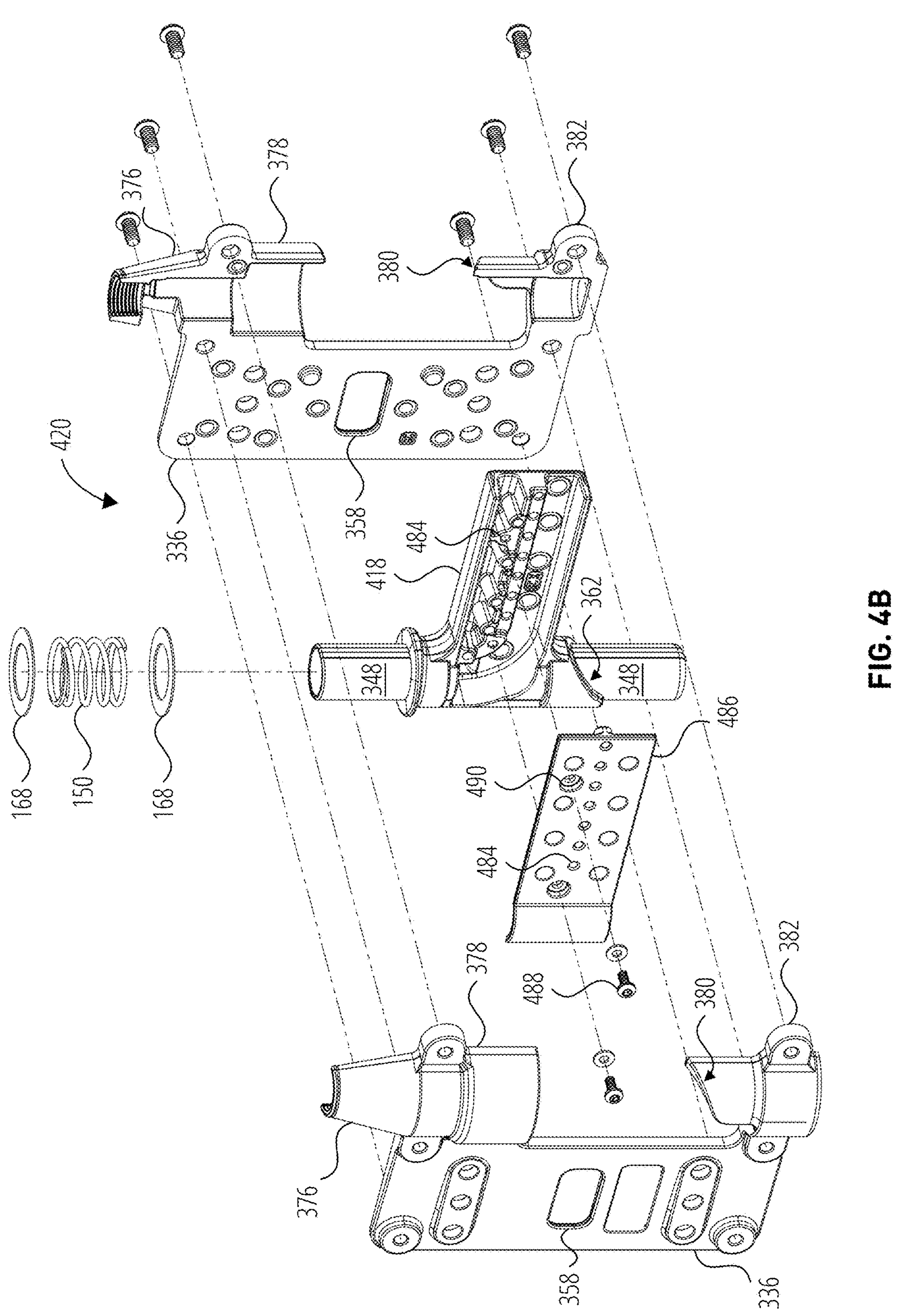
FIG. 4B illustrates an exploded isometric view of a pivot mechanism in accordance with an embodiment.

FIG. 4B illustrates an exploded isometric view of the pivot mechanism 420 in accordance with an embodiment. The pivot mechanism 420 may include the spring 150, the washer 168, the extension locking bracket 336, the rotating tubular member 348, the track securing screw access hole 358, the cam surface 362, the frustum 376, the spring cover 378, the camming surface 380, the camming surface base 382, the rotating tubular member connection arm 418, the rotating tubular member connection arm front plate 486, the rotating tubular member connection arm front plate fastener 488, the rotating tubular member front plate fastener holes 490, and/or the rotating tubular member fastener holes 484. In the exemplary figure, the respective individual components of the pivot mechanism 420 and their relationship to one another are easily viewable and understood.

Figure 5A:
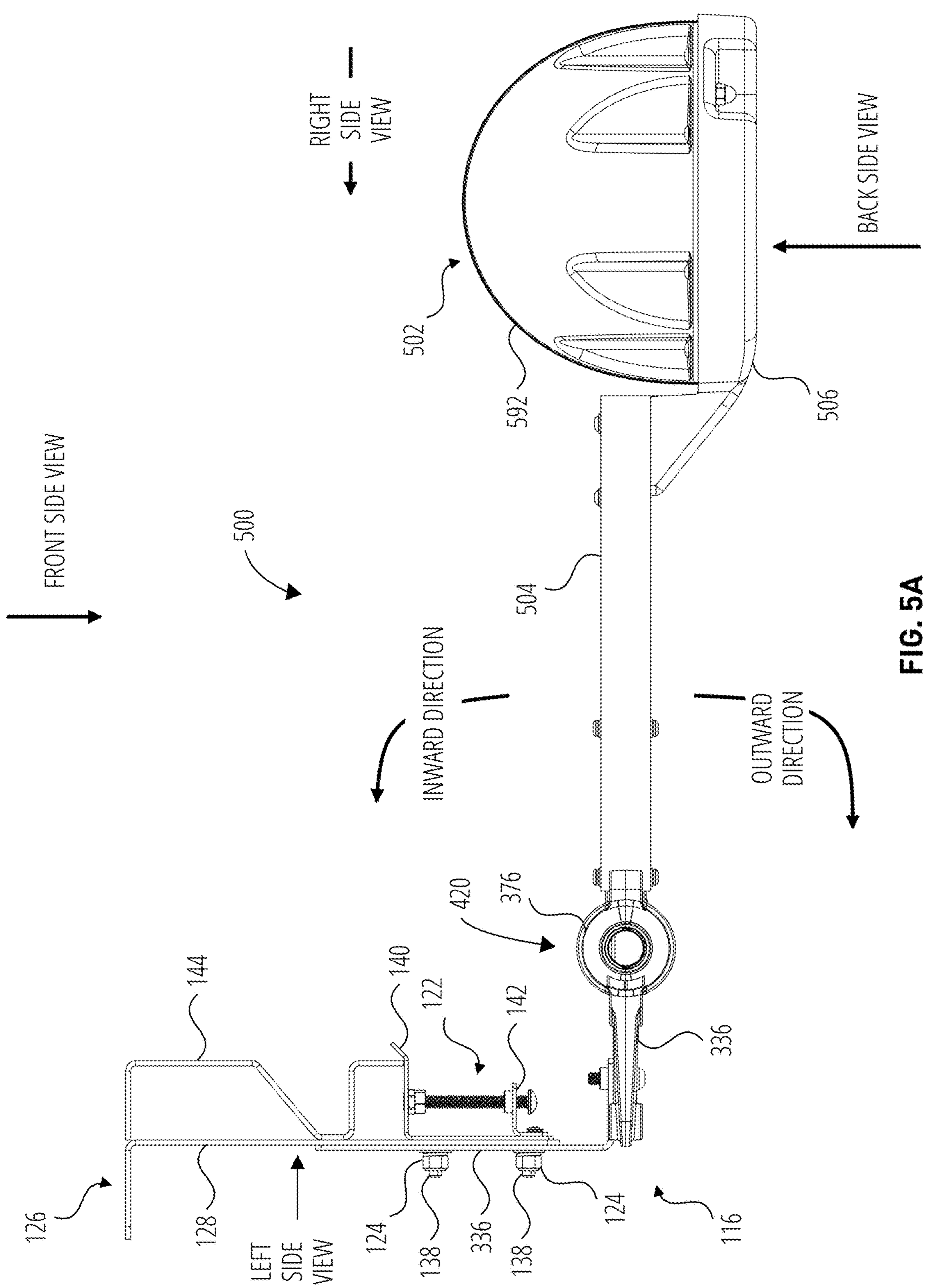
FIG. 5A illustrates a top view of a sensor mounting system in the left-side orientation with a sensor unit in the system initial position in accordance with an embodiment.

FIG. 5A illustrates a top view of a sensor mounting system 500 in the left-side orientation with a sensor unit 502 in the system initial position in accordance with an embodiment. The sensor mounting system 500 may include the pivot mechanism 420 shown in FIG. 4A. The sensor mounting system 500 may include the mounting base 116, the track securing screw 122, the bracket lock nuts 124, the surface mounting tab 126, the mounting bracket 128, the mounting bracket protrusions 138, the track clamp mechanism 140, the track securing bracket 142, the track 144, the extension locking bracket 336, the frustum 376, and/or the pivot mechanism 420. The sensor mounting system 500 may include a sensor unit 502, a sensor housing arm 504, a sensor housing 506, and/or a sensor shield 592. The sensor unit 502 may include the sensor housing arm 504, the sensor housing 506, and/or the sensor shield 592. The sensor housing 506 may include the sensor shield 592. The sensor unit 502 in FIG. 5A may correspond in function to the sensor unit 102 in FIG. 1A, the sensor housing arm 504 in FIG. 5A may correspond in function to the sensor housing arm 104 in FIG. 1A, and the sensor housing 506 in FIG. 5A may correspond in function to the sensor housing 106 of FIG. 1A.

The sensor mounting system 500 may include a similar (or identical) components relating to mounting of the sensor mounting system 500 as the sensor mounting system 100. The sensor mounting system 500 may partially differentiate from the sensor mounting system 100 in components and/or design of the pivot mechanism 420 (compared to the pivot mechanism 120 and/or pivot mechanism 320) and components of the sensor unit 502 (compared to the sensor unit 102).

The sensor shield 592 may be configured to protect a sensor, such as the image sensor 108 (shown in FIG. 1A). A sensor may be positioned underneath the sensor shield 592. For example, the sensor shield 592 may protect a sensor from sunlight and/or precipitation by shielding a sensor positioned underneath. The sensor shield 592 may also protect a sensor from impacts. The sensor shield 592 may be linear or curved, and may be made of metal, plastic, composite, or any other durable material. The sensor shield 592 may be coupled to the sensor housing 506, which may provide stability to the sensor shield 592 and house internal electrical components (such as the image sensor 108, the data transmission circuitry 110, the power supply connection 112, and/or the processor 114 shown in FIG. 1A). The sensor housing 506 may couple to the sensor housing arm 504.

Figure 5B:
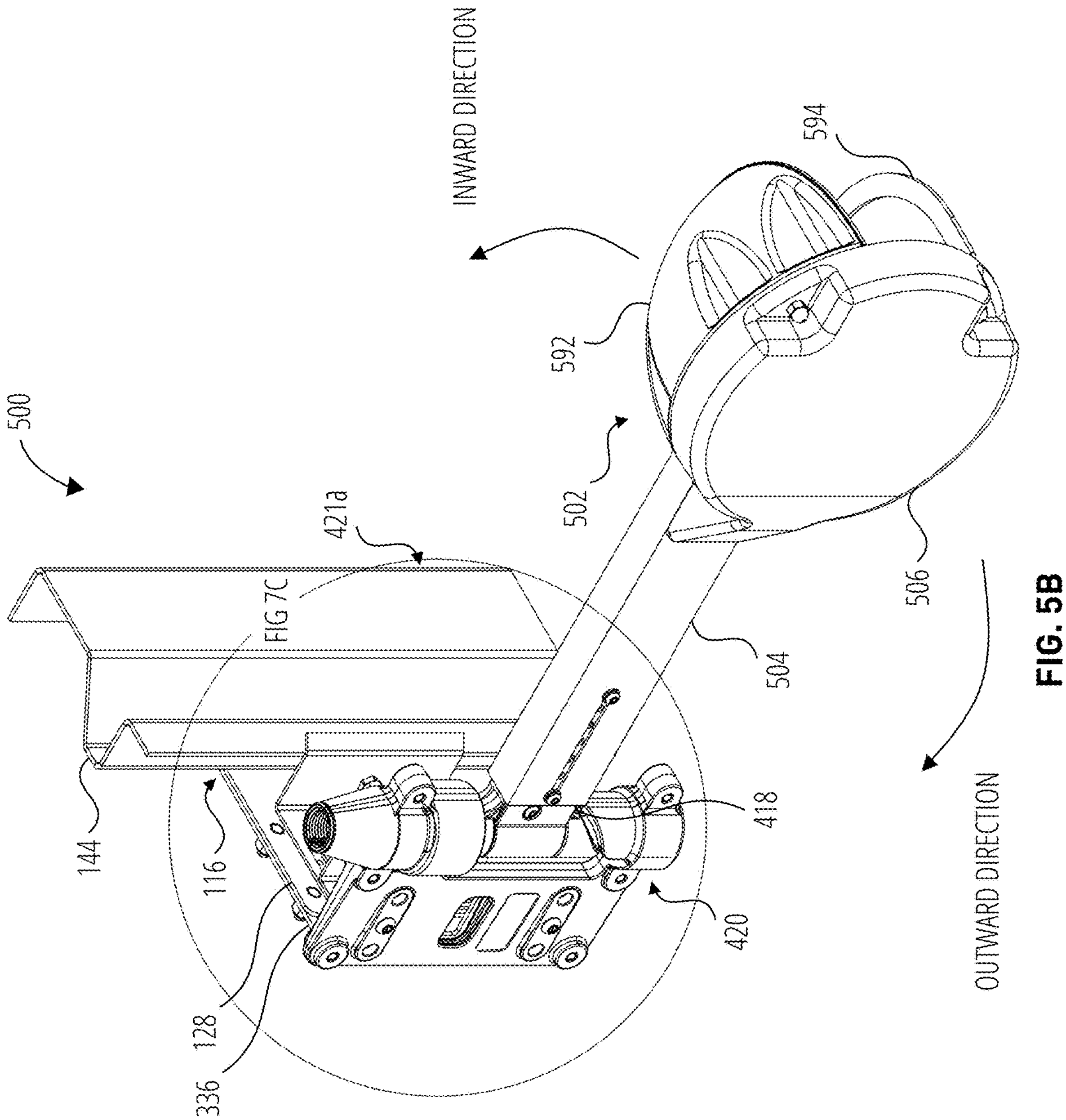
FIG. 5B illustrates an isometric view of a sensor mounting system in the left-side orientation with a sensor unit in the system initial position in accordance with an embodiment.

FIG. 5B illustrates an isometric view of the sensor mounting system 500 in the left-side orientation with the sensor unit 502 in the system initial position in accordance with an embodiment. The sensor mounting system 500 may include the mounting base 116, the mounting bracket 128, the track 144, the extension locking bracket 336, the pivot mechanism 420, the rotating tubular member connection arm 418, the sensor unit 502, the sensor housing arm 504, the sensor housing 506, and/or the sensor shield 592. The sensor mounting system 500 may include a sensor housing shelf 594. The sensor mounting system 500 may also include an exemplary view 421*a* with the pivot mechanism 420.

In FIG. 5B, the sensor mounting system 500 is shown with the sensor unit 502 in its system initial position. The pivot mechanism 420 enables the sensor unit 502 to rotate in either an outward direction or an inward direction. The inward direction is toward the track 144, while the outward direction is away from the track 144. Alternatively, the sensor mounting system 500 can be installed on a right-side orientation.

Also shown is the mounting base 116 secured to the track 144 via the track clamp mechanism 140. The mounting base 116 as is shown in other examples, also includes the surface mounting tab 126 (shown in FIG. 1A) that is configured to be rigidly fixed to the surface.

The sensor housing shelf 594 may be mounted to the sensor housing 506. The sensor housing shelf 594 may be configured for the image sensor 108 (shown in FIG. 1A) to be positioned on top of and/or coupled to. The sensor housing shelf 594 may be sized based on dimensions of the image sensor 108. When the image sensor 108 is positioned on top of and/or coupled to the sensor housing shelf 594, the sensor shield 592 may protect the image sensor 108 from sunlight, precipitation, and/or impact. In some embodiments, the image sensor 108 is positioned on top of the sensor housing shelf 594 and coupled to the sensor housing 506.

Figure 5C:
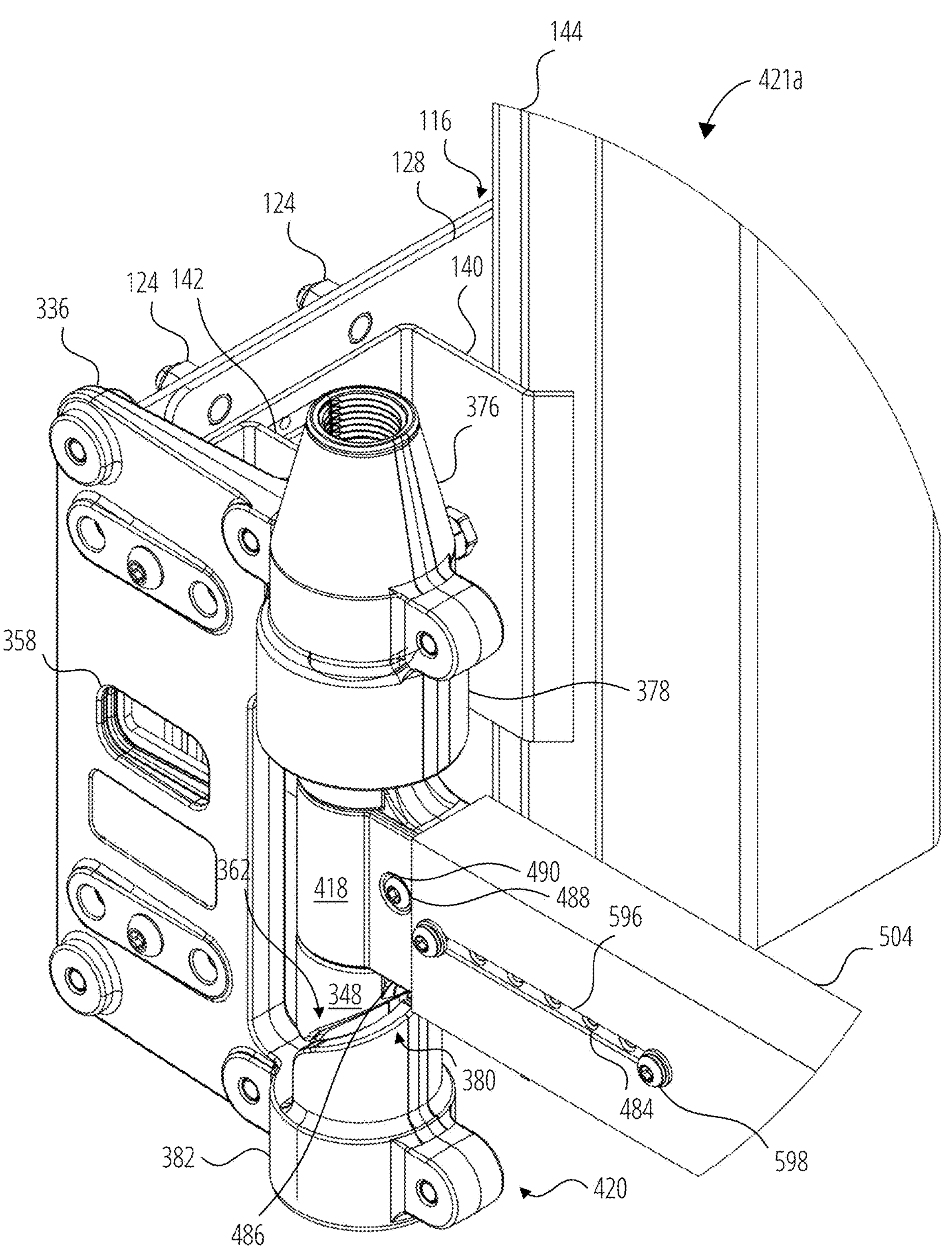
FIG. 5C illustrates an exemplary view with a pivot mechanism in the left-side orientation with a sensor unit in the system initial position in accordance with an embodiment.

FIG. 5C illustrates the exemplary view 421*a* with the pivot mechanism 420 in the left-side orientation with the sensor unit 502 in the system initial position in accordance with an embodiment. The exemplary view 421*a* may include the mounting base 116, the bracket lock nut 124, the mounting bracket 128, the track clamp mechanism 140, the track securing bracket 142, the track 144, the extension locking bracket 336, the rotating tubular member 348, the track securing screw access hole 358, the cam surface 362, the frustum 376, the spring cover 378, the camming surface 380, the camming surface base 382, the rotating tubular member connection arm 418, the pivot mechanism 420, the rotating tubular member fastener holes 484, the rotating tubular member connection arm front plate 486, the rotating tubular member connection arm front plate fasteners 488, the rotating tubular member front plate fastener holes 490, the sensor unit 502, and/or the sensor housing arm 504. The exemplary view 421*a* may include a sensor housing arm fastener slot 596 and/or sensor housing arm fasteners 598.

The sensor housing arm fastener slot 596 may align with the rotating tubular member fastener holes 484 of the rotating tubular member connection arm 418. The numerous rotating tubular member fastener holes 484, as well as a length of the sensor housing arm fastener slot 596, allow for customization of the sensor housing arm 504. Each of the sensor housing arm fasteners 598 may be inserted through the sensor housing arm fastener slot 596 and a respective rotating tubular member fastener holes 484 to couple the sensor housing arm 504 to the rotating tubular member connection arm 418. In some embodiments, two sensor housing arm fasteners 598 are used.

Figure 5D:
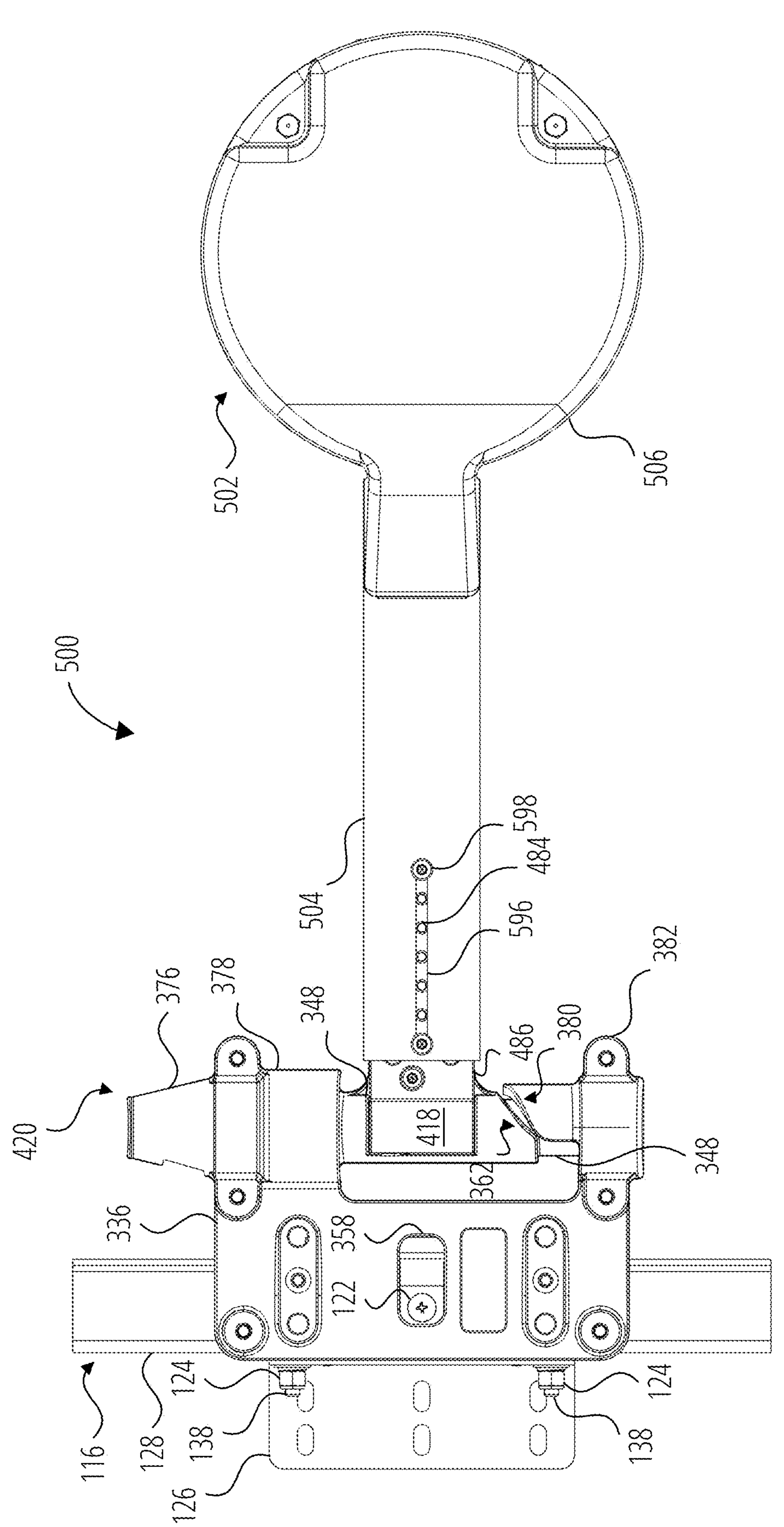
FIG. 5D illustrates a back side view of a sensor mounting system in the left-side orientation with a sensor unit in the system initial position in accordance with an embodiment.

FIG. 5D illustrates a back side view of the sensor mounting system 500 in the left-side orientation with the sensor unit 502 in the system initial position in accordance with an embodiment. The sensor mounting system 500 may include the mounting base 116, the track securing screw 122, the bracket lock nuts 124, the surface mounting tab 126, the mounting bracket 128, the mounting bracket protrusions 138, the extension locking bracket 336, the rotating tubular member 348, the track securing screw access hole 358, the cam surface 362, the frustum 376, the spring cover 378, the camming surface 380, the camming surface base 382, the rotating tubular member connection arm 418, the pivot mechanism 420, the rotating tubular member fastener holes 484, the rotating tubular member connection arm front plate 486, the sensor unit 502, the sensor housing arm 504, the sensor housing 506, the sensor housing arm fastener slot 596, and/or the sensor housing arm fasteners 598.

In this perspective, both the track securing screw 122 and the track securing screw access hole 158 are viewable and accessible. A user is able to access the track securing screw 122 via the track securing screw access hole 158 to adjust the track securing bracket 142 (shown in FIG. 5A). Also depicted is a different perspective of the mounting bracket protrusions 138 and the bracket lock nuts 124. In the exemplary embodiment, the mounting bracket protrusions 138 and bracket lock nuts 124 are threaded, but any kind of fastener combination may also be used.

Figure 5E:
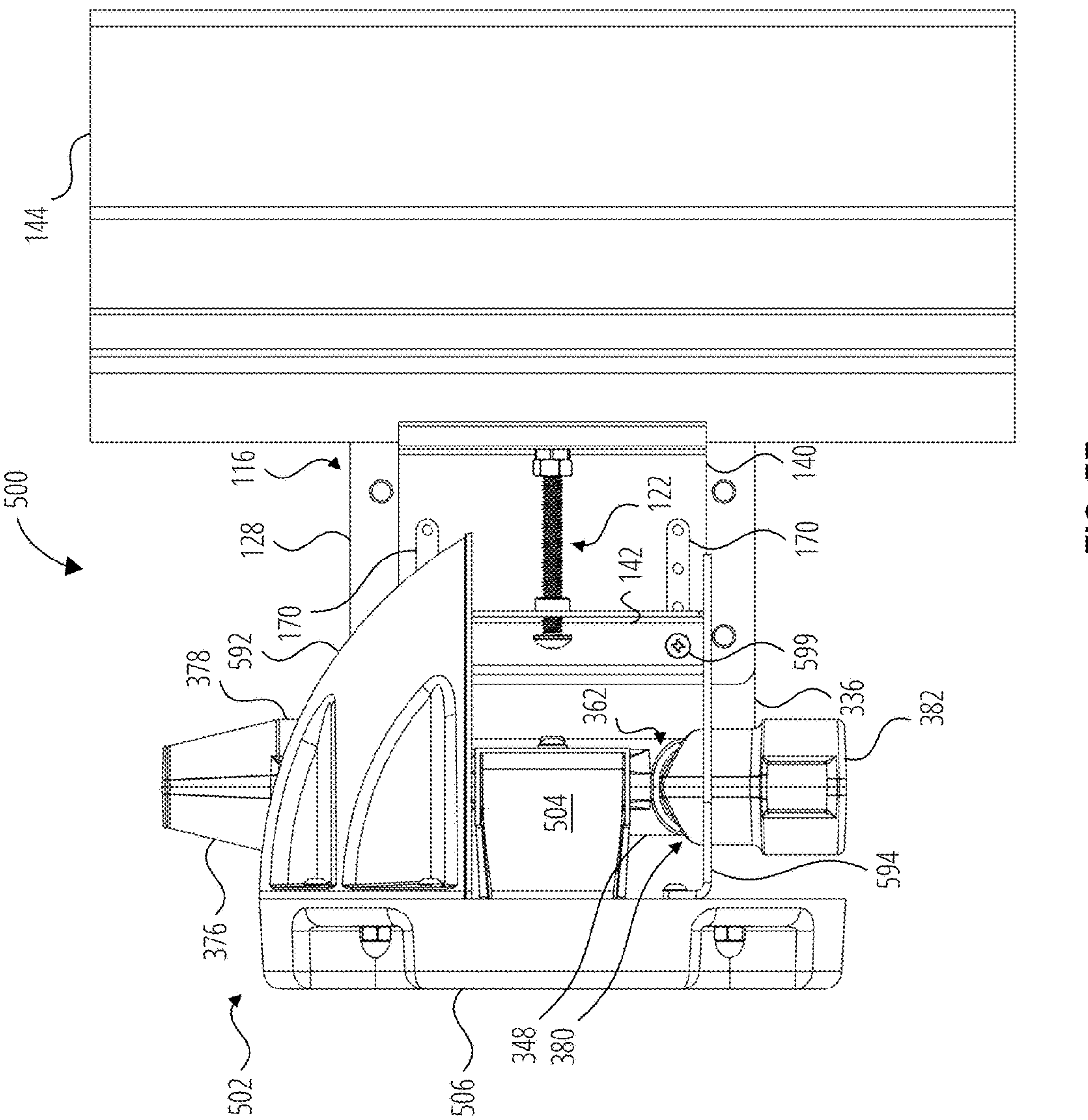
FIG. 5E illustrates a right side view of a sensor mounting system in the left-side orientation with a sensor unit in the system initial position in accordance with an embodiment.

FIG. 5E illustrates a right side view of the sensor mounting system 500 in the left-side orientation with the sensor unit 502 in the system initial position in accordance with an embodiment. The system may include the mounting base 116, the track securing screw 122, the mounting bracket 128, the track clamp mechanism 140, the track securing bracket 142, the track 144, the track securing bracket slots 170, the extension locking bracket 336, the rotating tubular member 348, the cam surface 362, the frustum 376, the spring cover 378, the camming surface 380, the camming surface base 382, the sensor unit 502, the sensor housing arm 504, the sensor housing 506, the sensor shield 592, the sensor housing shelf 594, and/or a pan-head screw 599.

The track clamp mechanism 140 may include the track securing screw 122, the track securing bracket 142, the track securing bracket slots 170, and/or corresponding pan-head screws 599 to couple to the mounting bracket 128 through pan-head screw holes 172 shown in FIG. 1E. The track clamp mechanism 140 coupled to the mounting base 116 may enable alignment of the track 144. In other embodiments, the pan-head screws 599 can be a different type of fastener such as a clip, pin, rivets, or other adjustment mechanism.

Figure 5F:
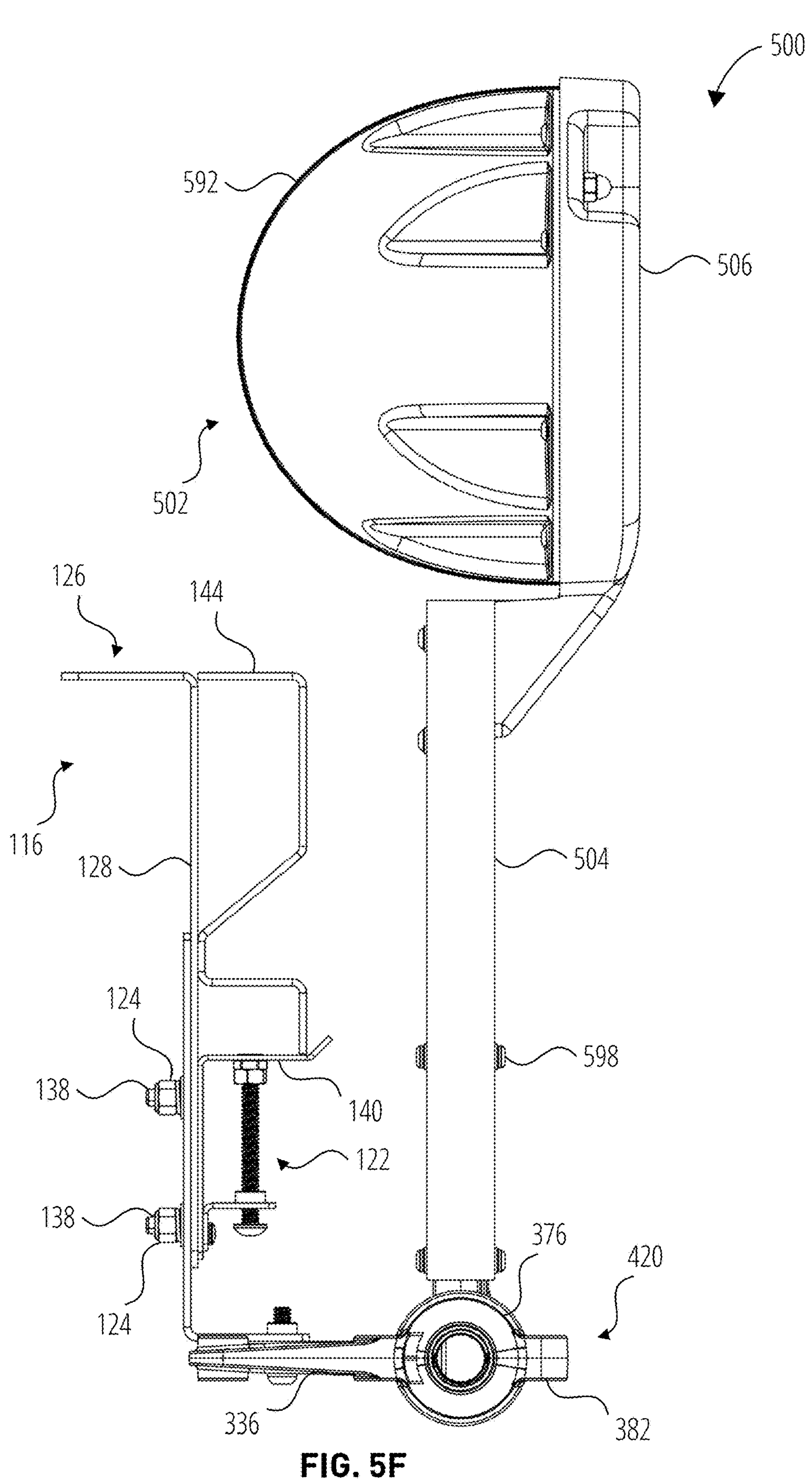
FIG. 5F illustrates a top view of a sensor mounting system in the left-side orientation with a sensor unit in the system inward position in accordance with an embodiment.

FIG. 5F illustrates a top view of the sensor mounting system 500 in the left-side orientation with the sensor unit 502 in the system inward position in accordance with an embodiment. The sensor mounting system 500 may include the mounting base 116, the track securing screw 122, the bracket lock nuts 124, the surface mounting tab 126, the mounting bracket 128, the mounting bracket protrusions 138, the track clamp mechanism 140, the track 144, the extension locking bracket 336, the frustum 376, the camming surface base 382, the pivot mechanism 420, the sensor unit 502, the sensor housing arm 504, the sensor housing 506, the sensor shield 592, and/or the sensor housing arm fasteners 598.

The system inward position embodiment may be immediately after the back side of the sensor unit 502 has been impacted which causes the pivot mechanism 420 to rotate in the inward direction, and immediately before the pivot mechanism 420 rotates in the outward direction to return the sensor unit 502 to the system initial position.

Figure 5G:
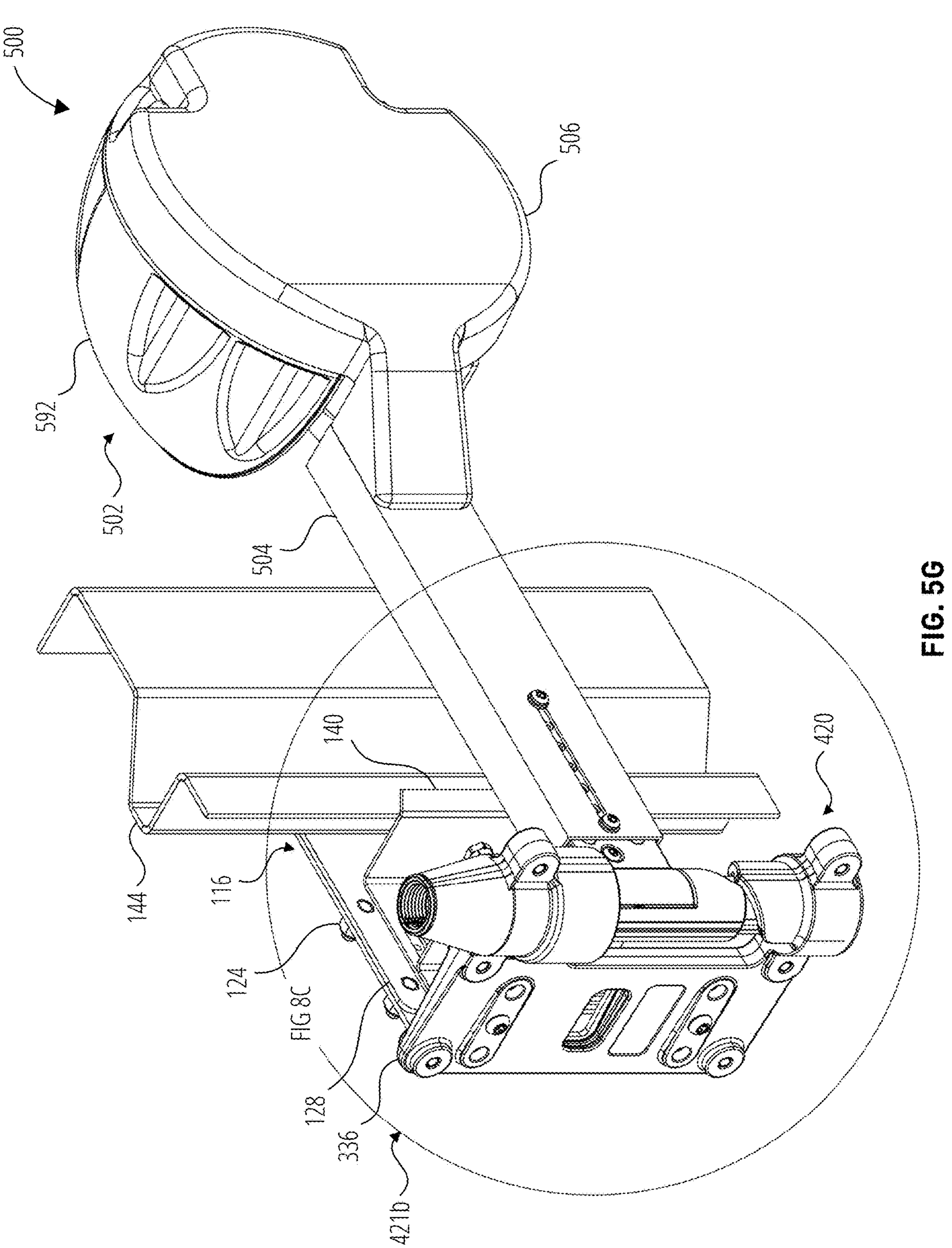
FIG. 5G illustrates an isometric view of a sensor mounting system in the left-side orientation with a sensor unit in the system inward position in accordance with an embodiment.

FIG. 5G illustrates an isometric view of the sensor mounting system 500 in the left-side orientation with the sensor unit 502 in the system inward position in accordance with an embodiment. The sensor mounting system 500 may include the mounting base 116, the bracket lock nut 124, the mounting bracket 128, the track clamp mechanism 140, the track 144, the extension locking bracket 336, the pivot mechanism 420, the sensor unit 502, the sensor housing arm 504, the sensor housing 506, and/or the sensor shield 592. The sensor mounting system 500 may also include an exemplary view 421*b* with the pivot mechanism 420.

This view shows a state of the pivot mechanism 420 when the sensor unit 502 is fully rotated in the inward direction. The sensor mounting system 500 in this view includes the sensor unit 502, sensor housing arm 504, the sensor housing 506, and the sensor shield 592 substantially parallel to the track 144. The mounting base 116 is secured to the track 144 and a surface (not shown).

The mounting bracket 128, the extension locking bracket 336, and/or the track clamp mechanism 140 may all remain stationary. The state of the pivot mechanism 420 is described in more detail with reference to FIG. 5H.

Figure 5H:
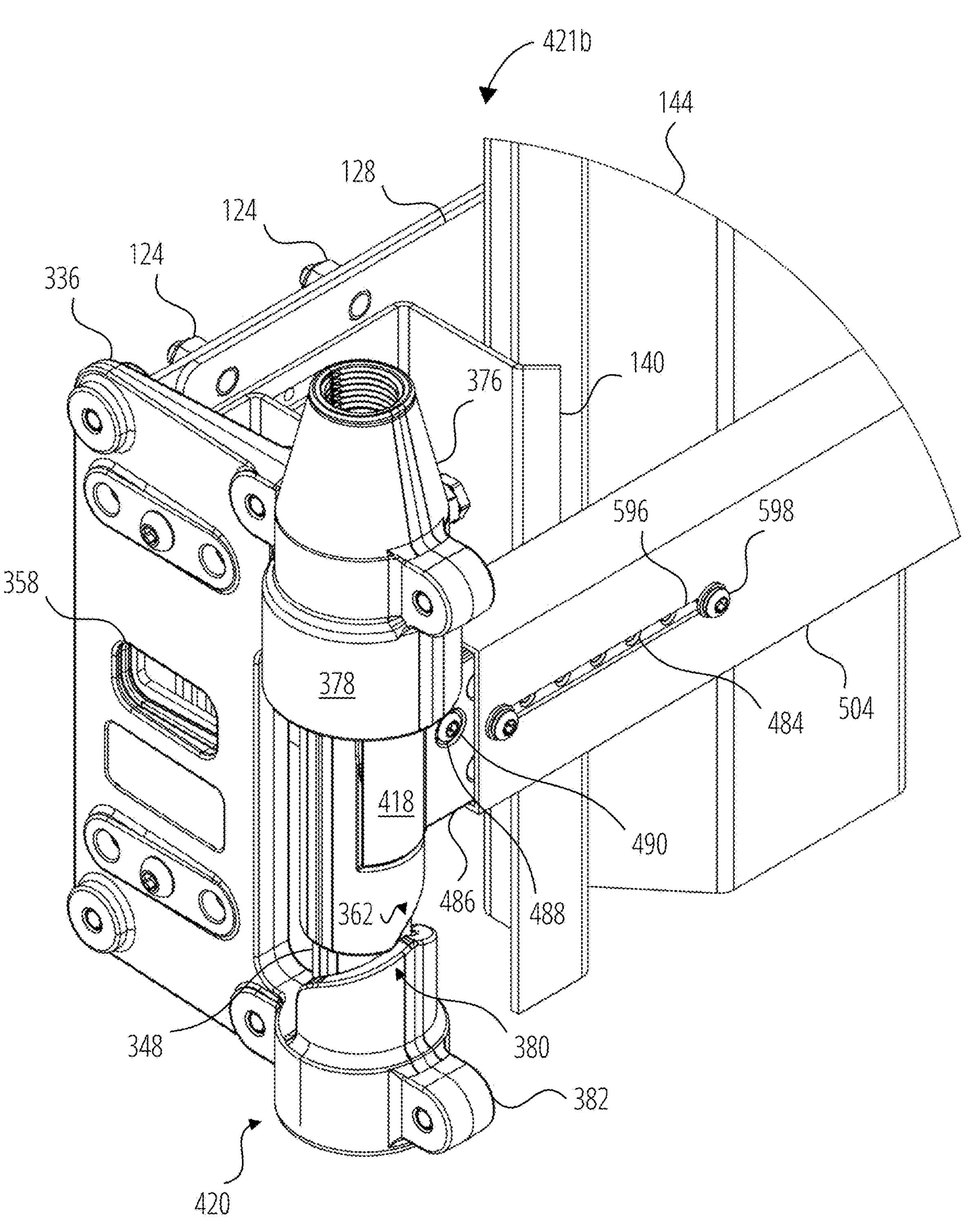
FIG. 5H illustrates a detailed isometric view of a pivot mechanism in the left-side orientation with a sensor unit in the system inward position in accordance with an embodiment

FIG. 5H illustrates the exemplary view 421*b* with the pivot mechanism 420 in the left-side orientation with the sensor unit 502 in the system inward position in accordance with an embodiment. The exemplary view 421*b* may include the bracket lock nut 124, the mounting bracket 128, the track clamp mechanism 140, the track 144, the extension locking bracket 336, the rotating tubular member 348, the track securing screw access hole 358, the cam surface 362, the frustum 376, the spring cover 378, the camming surface 380, the camming surface base 382, the rotating tubular member connection arm 418, the pivot mechanism 420, the rotating tubular member fastener holes 484, the rotating tubular member connection arm front plate 486, the rotating tubular member connection arm front plate fastener 488, the rotating tubular member front plate fastener holes 490, the sensor unit 502, the sensor housing arm 504, the sensor housing arm fastener slot 596, and/or the sensor housing arm fasteners 598.

In the exemplary embodiment, the back side of the sensor unit 502 has received a force which causes the pivot mechanism 420 to rotate in the inward direction. Specifically, the rotating tubular member connection arm 418 is impacted by the force, which may cause the rotation of the pivot mechanism 420. The cam surface 362 may move upwards on the camming surface 380, thereby compressing the spring 150. When the force applied to the back side of the sensor unit 502 is removed, the pivot mechanism 320 may be operable to return the sensor unit 502 to the system initial position without operator interaction, wherein the spring 150 may decompress by the downwards movement of the cam surface 362 on the camming surface 380.

Figure 5I:
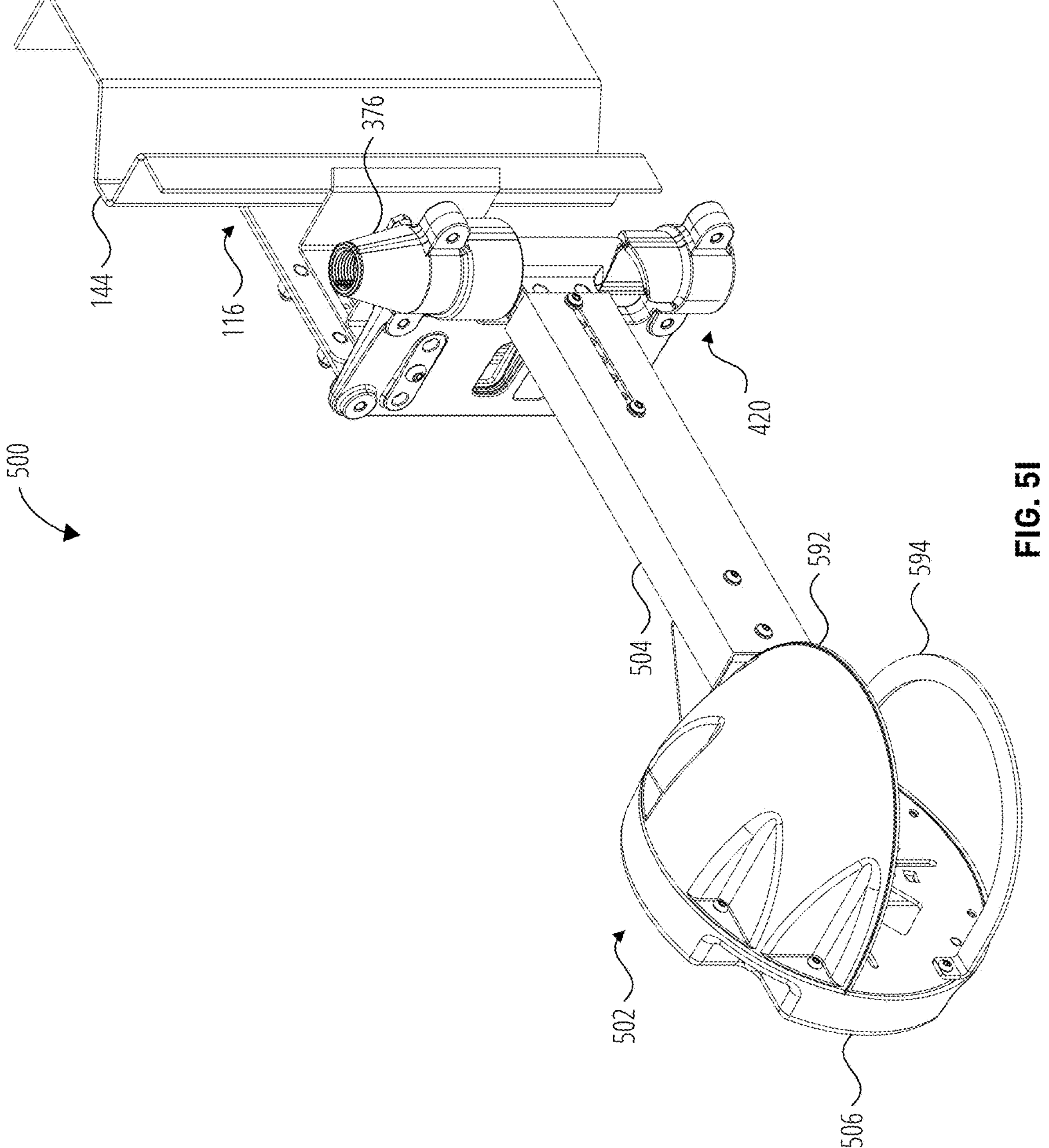
FIG. 5I illustrates an isometric view of a sensor mounting system in the left-side orientation with a sensor unit in the system outward position in accordance with an embodiment.

FIG. 5I illustrates an isometric view of the sensor mounting system 500 in the left-side orientation with the sensor unit 502 in the system outward position in accordance with an embodiment. The features of FIG. 5I remain the same as the features of FIG. 5A-FIG. 5H.

In the exemplary embodiment, the front side of the sensor unit 502 has received a force which causes the pivot mechanism 420 to rotate in the outward direction. Specifically, the rotating tubular member connection arm 418 is impacted by the force, which may cause the rotation of the pivot mechanism 420. The cam surface 362 may move upwards on the camming surface 380, thereby compressing the spring 150. When the force applied to the front side of the sensor unit 502 is removed, the pivot mechanism 320 may be operable to return the sensor unit 502 to the system initial position without operator interaction, wherein the spring 150 may decompress by the downwards movement of the cam surface 362 on the camming surface 380.

The innovative design of the sensor mounting system provides a comprehensive sensor detection area. The sensor unit may be able to gather sensor data regarding a nearby vehicle such as make, model, truck number, or license number, nearby individuals, or damage (such as a truck impacting property, or the like). A sensor unit with a sensor detection area that captures the area around a shipping trailer is likely to collide with forklifts. The integration of a spring-assisted pivot mechanism allows the sensor unit to return to its original sensor detection area after a collision (for example, if a forklift collides with the sensor unit). The unique combination of features ensures automatic sensor detection area reset and reduced downtime, enhanced visibility, enhanced safety and efficiency, and durability in warehouse operations.

The sensor unit's spring-assisted pivot mechanism returns the sensor unit to its original sensor detection area automatically after being hit, thereby reducing the time needed to manually reset the sensor unit to its original sensor detection area. Traditional sensor mounts require manual adjustments by an operator to reset their sensor detection area after being knocked out of position. The sensor mounting system eliminates this need, significantly reducing downtime and ensuring continuous monitoring without interruption. The sensor unit enhances the safety and efficiency of warehouse operations as well by maintaining a consistent and accurate sensor detection area. Operators can rely on the sensor for accurate visual information, reducing the risk of accidents and improving workflow efficiency. Lastly, the robust design of the sensor unit ensures durability and that the sensor unit can withstand the impacts commonly experienced in a busy shipping and receiving environment. The ability of the sensor unit to withstand hits and return to its original position ensures long-term reliability and minimal maintenance.

The sensor unit is attached to the spring-assisted pivot mechanism, which is in turn mounted on the mounting base. When any component of the sensor unit, sensor housing, or sensor housing arm is hit by a forklift or other equipment, the pivot mechanism allows the sensor unit to rotate from its original position. The spring, cam surface, and roller assembly design within the pivot mechanism activates immediately after the impact, returning the sensor to its original sensor detection area to transmit the video feed in real-time.

While the principles of the disclosed subject matter have been described herein, it is to be understood by those skilled in the art that this description is made only by way of example and not as a limitation as to the scope of the disclosed subject matter. Other embodiments are contemplated within the scope of the present disclosed subject matter in addition to the exemplary embodiments shown and described herein. Modifications and substitutions by one of ordinary skill in the art are considered to be within the scope of the present disclosed subject matter, which is not to be limited except by the following claims.

What is claimed is:

1. A sensor mounting system, comprising:

at least one sensor unit, including;

a sensor housing including a sensor; and a sensor housing arm coupled to the sensor housing; and a mounting base, including:

a pivot mechanism, including:

a rotating tubular member having a rotating tubular member connection arm coupled to the sensor housing arm; and an extension locking bracket;

a mounting bracket coupled to the extension locking bracket; and a surface mounting tab and a track clamp mechanism each coupled to the mounting bracket, wherein the surface mounting tab is configured to be rigidly fixed to a surface and mounting security is provided by a compression force of the track clamp mechanism, and the pivot mechanism is configured to rotate in response to an impacting force applied to the at least one sensor unit or the rotating tubular member in either an inward direction or in an outward direction.

2. The sensor mounting system of claim 1, the sensor housing further comprising:

an image sensor, a processor, a data transmission circuitry, and a power supply connection;

wherein the at least one sensor unit is operable to capture and provide sensor data of a sensor detection area.

3. The sensor mounting system of claim 1, wherein the pivot mechanism is configured to return the rotating tubular member to a system initial position and further comprises:

a spring;

a fixed tubular member configured for the rotating tubular member to rotate about;

a return mechanism, comprising:

a roller assembly, or a camming surface, wherein the roller assembly or the camming surface are configured to interact with a cam surface of the rotating tubular member, and the spring, the fixed tubular member, the return mechanism, and the cam surface are configured to enable the rotating tubular member connection arm to rotate in either an inward direction or an outward direction.

4. The sensor mounting system of claim 3, wherein the spring, the fixed tubular member, the return mechanism, and the cam surface are configured to enable the rotating tubular member connection arm to rotate in either an inward direction or an outward direction without operator interaction.

5. The sensor mounting system of claim 3, wherein:

in response to the impacting force being applied to a front side of the at least one sensor unit that pushes the at least one sensor unit from a system initial position in the outward direction, the cam surface is configured to move upwards on the return mechanism, thereby compressing the spring.

6. The sensor mounting system of claim 5, wherein, after the impacting force applied to the front side of the at least one sensor unit is removed, the pivot mechanism is operable to:

return the at least one sensor unit to the system initial position, wherein the spring is configured to decompress by a downward movement of the cam surface on the return mechanism.

7. The sensor mounting system of claim 3, wherein:

in response to the impacting force applied to a back side of the at least one sensor unit that pushes the at least one sensor unit from a system initial position in the inward direction, the cam surface is configured to move upwards on the return mechanism, thereby compressing the spring.

8. The sensor mounting system of claim 7, wherein, after the impacting force applied to the back side of the at least one sensor unit is removed, the pivot mechanism is operable to:

return the at least one sensor unit to the system initial position, wherein the spring is configured to decompress by a downward movement of the cam surface on the return mechanism.

9. The sensor mounting system of claim 1, wherein the impacting force is applied by a forklift, equipment, or a worker.

10. A mounting base for a sensor mounting system, comprising:

a pivot mechanism, including:

a rotating tubular member having a rotating tubular member connection arm coupled to a sensor housing arm; and an extension locking bracket;

a mounting bracket coupled to the extension locking bracket; and a surface mounting tab and a track clamp mechanism each coupled to the mounting bracket, wherein the surface mounting tab is configured to be rigidly fixed to a surface and mounting security is provided by a compression force of the track clamp mechanism, and the pivot mechanism is configured to rotate in response to an impacting force applied to the at least one sensor housing arm or the rotating tubular member in either an inward direction or in an outward direction.

11. The mounting base of claim 10, wherein the pivot mechanism further comprises:

a spring;

a fixed tubular member configured for the rotating tubular member to rotate about;

a return mechanism, comprising:

a roller assembly, or a camming surface, wherein the roller assembly or the camming surface are configured to interact with a cam surface of the rotating tubular member, and the spring, the fixed tubular member, the return mechanism, and the cam surface are configured to enable the rotating tubular member connection arm to rotate in either an inward direction or an outward direction.

12. The mounting base of claim 11, wherein:

in response to the impacting force being applied to a front side of the sensor housing arm that pushes the sensor housing arm from a system initial position in the outward direction, the cam surface is configured to move upwards on the return mechanism, thereby compressing the spring.

13. The mounting base of claim 12, wherein, after the impacting force applied to the front side of the sensor housing arm is removed, the pivot mechanism is operable to:

return the sensor housing arm to the system initial position, wherein the spring is configured to decompress by a downward movement of the cam surface on the return mechanism.

14. The mounting base of claim 11, wherein:

in response to the impacting force being applied to a back side of the sensor housing arm that pushes the sensor housing arm from a system initial position in the inward direction, the cam surface is configured to roll upward on the return mechanism, thereby compressing the spring.

15. The mounting base of claim 14, wherein, after the impacting force applied to the back side of the sensor housing arm is removed, the pivot mechanism is operable to:

return the sensor housing arm to the system initial position, wherein the spring is configured to decompress by a downward movement of the cam surface on the return mechanism.

16. The mounting base of claim 10, wherein the impacting force is applied by a forklift, equipment, or a worker.

17. A pivot mechanism system, comprising:

a sensor housing arm including one or more sensor housing arm fastener features; and a pivot mechanism, including:

a rotating tubular member having:

a rotating tubular member connection arm having one or more rotating tubular member connection arm fastener features; and a cam surface;

a spring;

a fixed tubular member configured for the rotating tubular member to rotate about; and a return mechanism comprising a roller assembly or a camming surface;

wherein the pivot mechanism is configured to rotate in either an inward direction or in an outward direction by the cam surface moving upwards on the return mechanism thereby compressing the spring, the one or more sensor housing arm fastener features are configured to align with the one or more rotating tubular member connection arm fastener features, and the one or more sensor housing arm fastener features and the one or more rotating tubular member connection arm fastener features are configured to couple the sensor housing arm to the rotating tubular member connection arm.

18. The pivot mechanism of claim 17, wherein the spring is configured to decompress by a downward movement of the cam surface on the return mechanism.

19. The pivot mechanism of claim 17, wherein the pivot mechanism is configured to position the sensor housing arm coupled to the pivot mechanism to or from a system initial position.

20. The pivot mechanism of claim 17, wherein the pivot mechanism is configured to position the sensor housing arm coupled to the pivot mechanism to or from a system inward position or a system outward position.

* * * * *